(12) United States Patent
Fong et al.

(10) Patent No.: US 12,238,024 B2
(45) Date of Patent: Feb. 25, 2025

(54) SHORT REFERENCE SIGNALS FOR SIDELINK COMMUNICATION

(71) Applicant: QUALCOMM Incorporated, San Diego, CA (US)

(72) Inventors: Lik Hang Silas Fong, Bridgewater, NJ (US); Hua Wang, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 17/399,593

(22) Filed: Aug. 11, 2021

(65) Prior Publication Data

US 2023/0051721 A1 Feb. 16, 2023

(51) Int. Cl.
| | |
|---|---|
| *H04L 5/00* | (2006.01) |
| *H04W 56/00* | (2009.01) |
| *H04W 72/0446* | (2023.01) |
| *H04W 72/20* | (2023.01) |

(52) U.S. Cl.
CPC ....... *H04L 5/0048* (2013.01); *H04W 72/0446* (2013.01); *H04W 72/20* (2023.01); *H04W 56/001* (2013.01)

(58) Field of Classification Search
CPC ... H04W 72/20; H04W 4/40; H04W 72/0446; H04L 5/0048
See application file for complete search history.

(56) References Cited

U.S. PATENT DOCUMENTS

| | | | | |
|---|---|---|---|---|
| 2019/0268904 | A1* | 8/2019 | Miao | H04W 52/02 |
| 2020/0029318 | A1* | 1/2020 | Guo | H04L 1/1822 |
| 2020/0029340 | A1* | 1/2020 | He | H04W 76/14 |
| 2020/0146000 | A1* | 5/2020 | Shin | H04L 27/3809 |
| 2020/0153574 | A1* | 5/2020 | Shin | H04W 4/40 |
| 2020/0196255 | A1* | 6/2020 | Cheng | H04L 5/0064 |
| 2020/0305126 | A1* | 9/2020 | Li | H04L 1/0027 |
| 2020/0313825 | A1* | 10/2020 | Ryu | H04L 5/0051 |
| 2021/0194652 | A1* | 6/2021 | Khoryaev | H04L 5/0048 |
| 2021/0314933 | A1* | 10/2021 | Zhang | H04W 72/20 |
| 2022/0070036 | A1* | 3/2022 | Kwon | H04W 72/20 |
| 2022/0190983 | A1* | 6/2022 | Zhao | H04L 5/0051 |
| 2022/0407652 | A1* | 12/2022 | Lee | H04L 5/0053 |

FOREIGN PATENT DOCUMENTS

WO WO-2021101308 A1 * 5/2021 ........... H04L 5/0044

* cited by examiner

*Primary Examiner* — Yee F Lam
(74) *Attorney, Agent, or Firm* — Holland & Hart LLP

(57) ABSTRACT

Methods, systems, and devices for wireless communications are described. In some examples, a wireless communications system may support short reference signals for sidelink communication. A transmitting user equipment (UE) and a receiving UE may receive, from a base station, configuration signaling that indicates a set of sidelink resources that includes a set of slots within a subcarrier. A subset of the slots may include a first set of symbols allocated to a physical sidelink shared channel (PSSCH) and a second set of symbols allocated to a reference signal, where the first set of symbols comes before the second set of symbols in a time domain. The transmitting UE may transmit, to the receiving UE, a reference signal over the second set of symbols and the receiving UE may utilize the reference signal to decode data message received from the transmitting UE.

26 Claims, 15 Drawing Sheets

SHORT REFERENCE SIGNALS FOR SIDELINK COMMUNICATION

FIELD OF TECHNOLOGY

The following relates to wireless communications, including short reference signals for sidelink communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a wireless communications system may support sidelink communication or communication between two or more UEs. In some examples, a transmitting UE may select sidelink resources for a sidelink transmission to a receiving UE autonomously from a set of configured sidelink resources using sensing procedures and may indicate the selected sidelink resources to other UEs via sidelink control information (SCI). The receiving UE may receive the SCI from the transmitting UE and in some cases, may receive additional SCI from other transmitting UEs. Different transmitting UEs may have different transmission timings and, as such, SCI from different transmitting UEs may arrive at the receiving UE at different times.

SUMMARY

The described techniques relate to improved methods, systems, devices, and apparatuses that support short reference signals for sidelink communication. Generally, the described techniques provide for a user equipment (UE) allocating a portion of configured sidelink resources for reference signals, where the reference signals may support sidelink communications (e.g., synchronization or other timing adjustments related to sidelink signals, decoding of sidelink signals, or other functions related to the transmission or reception of sidelink signals). In some examples, a receiving UE may receive configuration signaling from a base station indicating a set of slots to be used for sidelink communication. A subset of the slots may include a first set of symbols allocated for a physical sidelink shared channel (PSSCH) and a second set of symbols allocated for reference signals. The first set of symbols may be located before the second set of symbols in the time domain. The receiving UE may receive reference signals over at least a portion of the resources of the second set of symbols from two or more transmitting UEs. The receiving UE may then utilize the reference signals to decode sidelink control information (SCI) from the two or more transmitting UE and subsequently decode data messages from one or both of the transmitting UEs. For example, the receiving UE may utilize the reference signals to account for any difference in transmission timing between two or more different transmitting UEs.

A method for wireless communications at a first wireless device is described. The method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals and transmitting, to a second wireless device and based on the configuration signaling, a reference signal of the one or more types over at least the subset of resources within the respective second set of symbols of a slot included in the subset of slots.

An apparatus for wireless communications at a first wireless device is described. The apparatus may include a processor, memory coupled with the processor, and instructions stored in the memory. The instructions may be executable by the processor to cause the apparatus to receive, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals and transmit, to a second wireless device and based on the configuration signaling, a reference signal of the one or more types over at least the subset of resources within the respective second set of symbols of a slot included in the subset of slots.

Another apparatus for wireless communications at a first wireless device is described. The apparatus may include means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals and means for transmitting, to a second wireless device and based on the configuration signaling, a reference signal of the one or more types over at least the subset of resources within the respective second set of symbols of a slot included in the subset of slots.

A non-transitory computer-readable medium storing code for wireless communications at a first wireless device is described. The code may include instructions executable by a processor to receive, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals and transmit, to a second wireless device and based on the configuration signaling, a reference signal of the one or more types over at least the subset of resources within the respective second set of symbols of a slot included in the subset of slots.

In some examples of the method, apparatuses, and non-transitory computer-readable medium described herein, transmitting the reference signal of the one or more types may include operations, features, means, or instructions for transmitting a synchronization signal (SS).

In some examples of the method, apparatuses, and non-transitory computer-readable medium described herein, the SS may be generated using an m-sequence, or a gold sequence, or any combination thereof.

In some examples of the method, apparatuses, and non-transitory computer-readable medium described herein, transmitting the reference signal of the one or more types may include operations, features, means, or instructions for transmitting a sounding reference signal (SRS), a demodulation reference signal (DMRS), a channel state information reference signal (CSI-RS), a phase-tracking reference signal (PT-RS), a frequency-tracking reference signal, an adaptive gain control (AGC) acquisition signal, a beam training reference signal, a positioning reference signal (PRS), or a slot aggregation reference signal.

Some examples of the method, apparatuses, and non-transitory computer-readable medium described herein may further include operations, features, means, or instructions for determining one or more resources of at least the subset of resources for transmitting the reference signal based on an identifier (ID) associated with the first user equipment (UE).

In some examples of the method, apparatuses, and non-transitory computer-readable medium described herein, a location of the subset of slots within the set of multiple slots may be based on a periodicity, the periodicity corresponding to a quantity of slots of a second subset of the set of multiple slots between a first slot of the subset of slots and a second slot of the subset of slots.

In some examples of the method, apparatuses, and non-transitory computer-readable medium described herein, the respective second set of symbols spans two symbols.

In some examples of the method, apparatuses, and non-transitory computer-readable medium described herein, the subset of the slots each include a respective first gap symbol and a respective second gap symbol, the respective second set of symbols for a slot between the respective first gap symbol and the respective second gap symbol for the slot.

In some examples of the method, apparatuses, and non-transitory computer-readable medium described herein, a second subset of the set of resources of the respective second set of symbols may be allocated to a physical sidelink feedback channel (PSFCH).

A method for wireless communications at a second wireless device is described. The method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals and receiving, from a first wireless device and based on the configuration signaling, a reference signal of the one or more types over at least the subset of resources within the respective second set of symbols of a slot included in the subset of slots.

An apparatus for wireless communications at a second wireless device is described. The apparatus may include a processor, memory coupled with the processor, and instructions stored in the memory. The instructions may be executable by the processor to cause the apparatus to receive, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals and receive, from a first wireless device and based on the configuration signaling, a reference signal of the one or more types over at least the subset of resources within the respective second set of symbols of a slot included in the subset of slots.

Another apparatus for wireless communications at a second wireless device is described. The apparatus may include means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals and means for receiving, from a first wireless device and based on the configuration signaling, a reference signal of the one or more types over at least the subset of resources within the respective second set of symbols of a slot included in the subset of slots.

A non-transitory computer-readable medium storing code for wireless communications at a second wireless device is described. The code may include instructions executable by a processor to receive, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals and receive, from a first wireless device and based on the configuration signaling, a reference signal of the one or more types over at least the subset of resources within the respective second set of symbols of a slot included in the subset of slots.

Some examples of the method, apparatuses, and non-transitory computer-readable medium described herein may further include operations, features, means, or instructions for decoding one or more data messages from the first wireless device based on the reference signal.

In some examples of the method, apparatuses, and non-transitory computer-readable medium described herein, receiving the reference signal of the one or more types may include operations, features, means, or instructions for receiving an SS.

In some examples of the method, apparatuses, and non-transitory computer-readable medium described herein, the SS may be generated using an m-sequence, or a gold sequence, or any combination thereof.

In some examples of the method, apparatuses, and non-transitory computer-readable medium described herein, receiving the reference signal of the one or more types may include operations, features, means, or instructions for receiving a SRS, a DMRS, a CSI-RS, a PT-RS, a frequency-tracking reference signal, an AGC acquisition signal, a beam training reference signal, a PRS, or a slot aggregation reference signal.

Some examples of the method, apparatuses, and non-transitory computer-readable medium described herein may further include operations, features, means, or instructions for determining one or more resources of at least the subset of resources for transmitting the reference signal based on an ID associated with the first UE.

In some examples of the method, apparatuses, and non-transitory computer-readable medium described herein, a location of the subset of slots within the set of multiple slots may be based on a periodicity, the periodicity corresponding to a quantity of slots of a second subset of the set of multiple slots between a first slot of the subset of slots and a second slot of the subset of slots.

In some examples of the method, apparatuses, and non-transitory computer-readable medium described herein, the respective second set of symbols spans two symbols.

In some examples of the method, apparatuses, and non-transitory computer-readable medium described herein, the subset of the slots each include a respective first gap symbol and a respective second gap symbol, the respective second set of symbols for a slot between the respective first gap symbol and the respective second gap symbol for the slot.

In some examples of the method, apparatuses, and non-transitory computer-readable medium described herein, a second subset of the set of resources of the respective second set of symbols may be allocated to a PSFCH.

DETAILED DESCRIPTION

Figure 1:
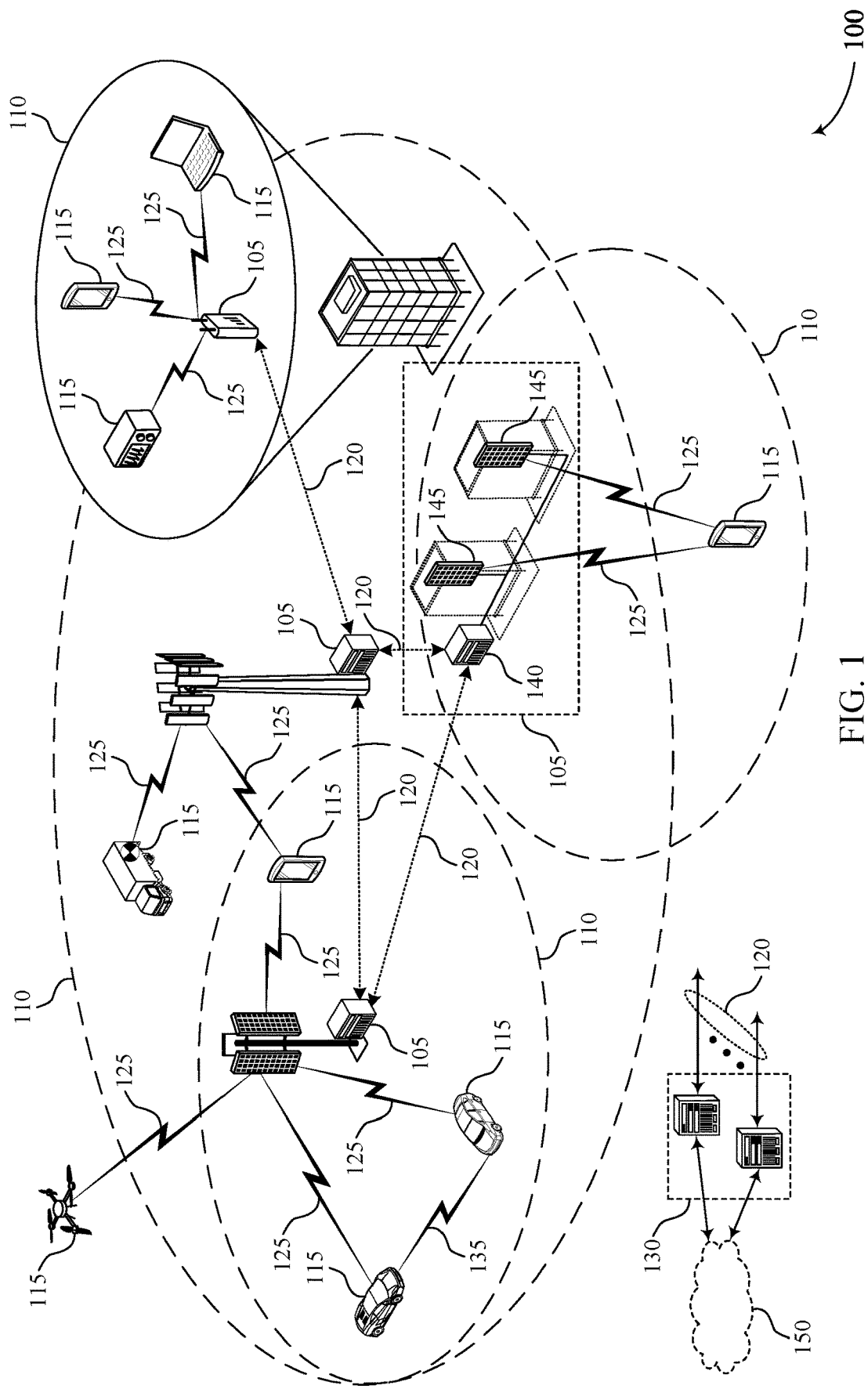
FIGS. 1 and 2 illustrate examples of a wireless communications system that supports short reference signals for sidelink communication in accordance with aspects of the present disclosure.

A wireless communications system may support sidelink communication or communication between two or more user equipment (UEs). In some resource allocation modes, a UE may select resources from a preconfigured set of resources for communication with other UEs using sensing. In some examples, a receiving UE may receive data messages from multiple transmitting UEs and, as such, may decode multiple sidelink control information (SCIs) from the multiple transmitting UEs in order to decode the data messages. However, SCI from different transmitting UEs may have different arrival times. In such example, the receiving UE may utilize a demodulation reference signal (DMRS) to address the difference in arrival times between the SCIs. But, in some cases, the difference in arrival times between the SCIs may be significant and the receiving UE may be unable to account for the timing difference using only the DMRS.

As described herein, the network may allocate a region of the preconfigured set of resources for reference signals that may support sidelink communications (e.g., may support synchronization or other timing adjustments, demodulation, or other functions related to the transmission or reception of sidelink signals). For example, the base station may transmit a configuration message to a transmitting UE and the receiving UE indicating a set of slots for sidelink communication. Some or all of the slots may include a first set of symbols allocated for a physical sidelink shared channel (PSSCH) and a second set of symbols allocated for one or more reference signals, where the first set of symbols is located before the second set of symbols. The one or more reference signals may include a synchronization signal (SS), a sounding reference signal (SRS), a DMRS, a channel state information reference signal (CSI-RS), a phase-tracking reference signal (PT-RS), a frequency-tracking reference signal, an adaptive gain control (AGC) signal, a beam training reference signal, a positioning reference signal (PRS), a slot aggregation reference signal, etc. In the case that resources of the second set of symbols are allocated for an SS, the receiving UE may utilize the received SS from the transmitting UE to decode one or more data message received from the transmitting UE over resources of the first set of symbols. The techniques as described herein may aid in decoding data messages from the multiple transmitting UEs, among other potential benefits. For example, techniques as described herein may allow a receiving UE to account for timing differences between multiple transmitting UE's SCI.

Aspects of the disclosure are initially described in the context of wireless communications systems. Additional aspects are described in the context of slot formats, a periodic scheme, and a process flow. Aspects of the disclosure are further illustrated by and described with reference to apparatus diagrams, system diagrams, and flowcharts that relate to short reference signals for sidelink communication.

FIG. 1 illustrates an example of a wireless communications system 100 that supports short reference signals for sidelink communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals (SSs), system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the UE 115 may allocate a portion of configured sidelink resources for reference signals, where the reference signals may be used for sidelink timing adjustments or to otherwise support the decoding of sidelink signals. In some examples, a receiving UE 115 may receive configuration signaling from a base station 105 indicating a set of slots to be used for sidelink communication. A subset of the slots may include a first set of symbols allocated for a PSSCH and a second set of symbols allocated for reference signals. The first set of symbols may be located before the second set of symbols in the time domain. The receiving UE 115 may receive reference signals over at least a portion of the resources of the second set of symbols from two or more transmitting UEs 115. The receiving UE 115 may then utilize the reference signals to decode SCI from the two or more transmitting UEs 115 and subsequently decode data messages from one or both of the transmitting UEs 115. For example, the receiving UE 115 may utilize the reference signals to account for any difference in transmission timing between two or more different transmitting UEs 115.

Figure 2:
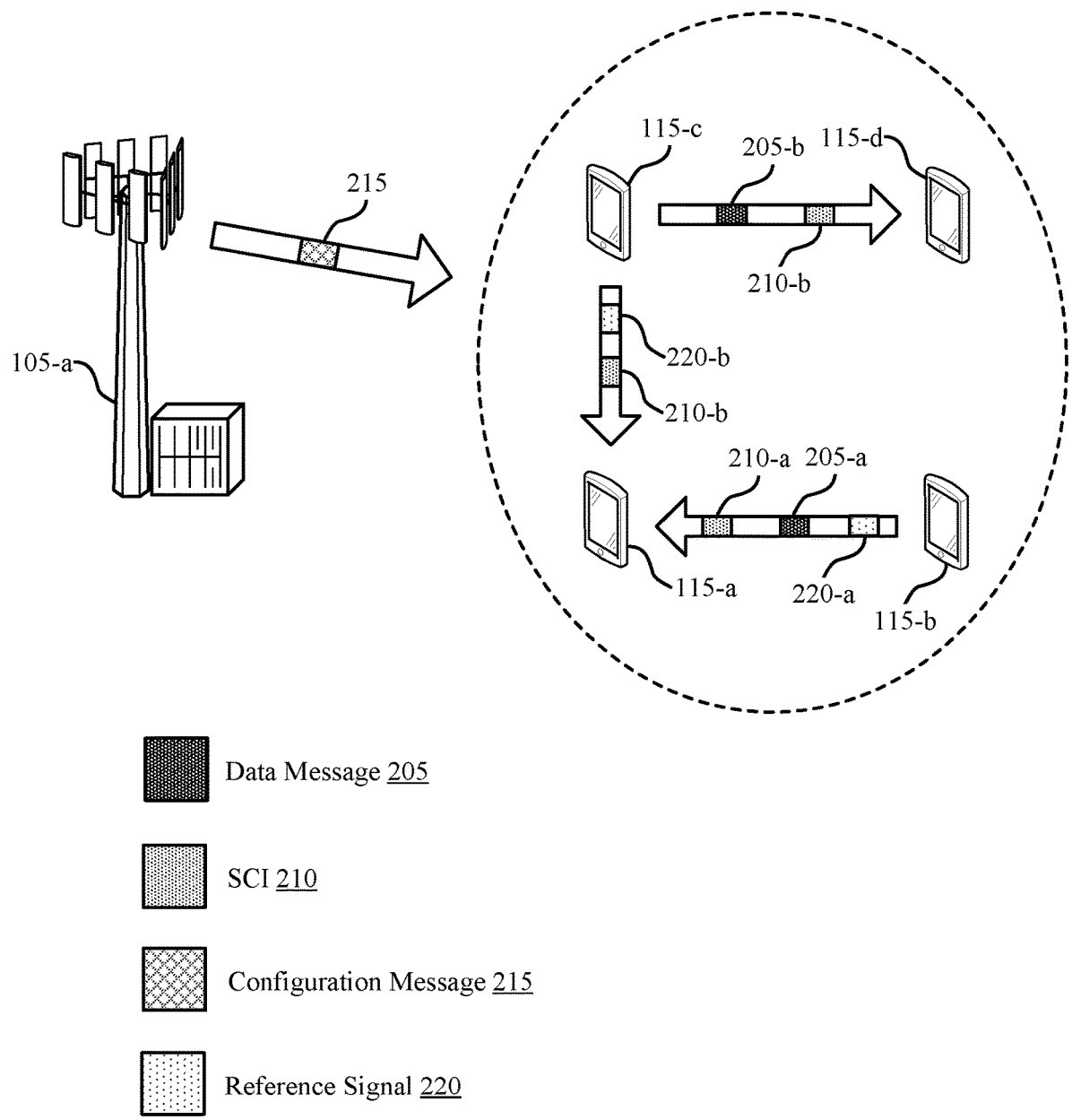

FIG. 2 illustrates an example of a wireless communications system 200 that supports short reference signals for sidelink communication in accordance with aspects of the present disclosure. In some examples, the wireless communications system 200 may implement aspects of a wireless communications system 100. For example, the wireless communications system 200 may include a base station 105-a, a UE 115-a, a UE 115-b, a UE 115-c, and a UE 115-d which may be examples of base stations 105 and a UE 115 as described with reference to FIG. 1.

In some examples, the wireless communications system 200 may support sidelink communication or communication between two or more UEs 115. The UEs 115 that are capable of sidelink communication may allocate resources for sidelink transmissions using one of two different modes, which in some cases may be referred to as resource allocation modes. In mode 1, the base station 105-a may schedule sidelink resources to be used by the UE 115 for sidelink transmissions (e.g., via radio resource control (RRC) or downlink control information (DCI)). In mode 2, the UE 115 may autonomously determine sidelink resources for sidelink transmissions from a set of sidelink resources that are configured by the base station 105-a or a set of sidelink resources that are pre-configured at the UE 115. To determine the sidelink resources in mode 2, the UE 115 may undergo a sensing procedure. During the sensing procedure, the UE 115 may decode SCI from other UEs 115 during a sensing window and additionally, determine a signal strength value (e.g., RSRP) of reference signals (e.g., DMRS) received over the set of the sidelink resources (e.g., PSSCH resources or physical sidelink control channel (PSCCH) resources). From this information, the UE 115 may determine candidate sidelink resources (e.g., resources that are not occupied by other UEs 115) and select sidelink resources for sidelink transmission from the candidate sidelink resources.

A transmitting UE 115 operating in mode 2 may utilize SCI to schedule (via sensing) and transmit sidelink transmissions to other UEs 115 and a receiving UE 115 may utilize the SCI to decode sidelink transmissions from transmitting UEs 115 and provide feedback related to the sidelink transmissions. In some examples, SCI may be split into two stages. First stage SCI (SCI 1) may carry information related to PSSCH resource allocation and may be received over sidelink resources of the PSCCH. Second stage SCI may carry information for PSSCH decoding (e.g., a modulation and coding scheme (MCS), a new data indicator (NDI), or a hybrid automatic repeat request (HARQ) process identifier (ID)) and may be received over sidelink resources of the PSSCH. Sidelink transmissions over sidelink resources of the PSSCH may be unicast (e.g., transmitted to one UE 115), groupcast (e.g., transmitted to a group of UEs 115), or broadcast (e.g., transmitted to all UEs 115).

When a receiving UE 115 receives a data message from a transmitting UE 115, the receiving UE 115 may transmit feedback information (e.g., HARQ message) related to the data message to the transmitting UE 115. The receiving UE 115 may transmit feedback messages over sidelink resources of the physical sidelink feedback channel (PSFCH). The PSFCH may be located after the PSSCH and the PSCCH in a time domain of a slot and in some examples, may occupy 2 symbols. In some examples, the sidelink resources of the PSFCH may be configured periodically. The periodicity of the PSFCH may be 1, 2, or 4 slots. That is, there may be a slot with PSFCH every 1, 2, or 4 slots within a resource pool (e.g., set of sidelink resources configured for the UE 115). The UE 115 may select specific sidelink resources on which to transmit feedback messages based on information such as the subchannel used to receive the data message (e.g., subchannel ID) and the transmitting UE 115 (e.g., source ID). If the receiving UE 115 is unable to decode the data message received from the transmitting UE 115, the receiving UE 115 may transmit negative acknowledgement (NACK) to the transmitting UE 115 via the PSFCH. Alternatively, if the receiving UE 115 is able to decode the data message received from the transmitting UE 115, the receiving UE may transmit acknowledgement (ACK) feedback via the PSFCH. In some examples, the receiving UE may have the option to transmit NACK-only feedback for data messages transmitted via groupcast.

As described above, a receiving UE 115 operating in mode 2 may decode SCI (e.g., SCI 1) from other UEs 115 to get sidelink resource allocation information. In one example, a UE 115-*b* may transmit a data message 205-*a* to a UE 115-*a* and a UE 115-*c* may transmit a data message 205-*b* to a UE 115-*d*. Prior to receiving the data message 205-*a* and the UE 115-*c* transmitting the data message 205-*b* to the UE 115-*b*, the UE 115-*a* may receive SCI 210-*a* from the UE 115-*b* and SCI 210-*b* from the UE 115-*c* and use the SCI to gain pertinent resource allocation information which the UE 115-*a* may use to decode the data message 205-*a*. However, in some examples, the UE 115-*b* and the UE 115-*c* may have different transmission times. As such, the UE 115-*a* may be unable to decode both the SCI 210-*a* from the UE 115-*b* and the SCI 210-*b* from the UE 115-*c* and subsequently may be unable to decode the data message 205-*a*. In some examples, DMRSs received over the PSCCH may be used to do time estimation and fast Fourier transform (FFT) window adjustment at the UE 115-*a*. But using DMRS may only allow the UE 115-*a* to recover from a timing misalignment of less 1.5 UEs 115 that use different synchronization reference UEs 115 may have a timing difference that extends beyond 1.5 µs and as such, using a DMRS for time estimation and FFT window adjustment may be insufficient to enable the UE 115-*a* to decode SCI 210-*a* from the UE 115-*b* and SCI 210-*b* from the UE 115-*c*.

In some wireless communications systems, a receiving UE 115 may gain knowledge of receiver timing from detecting SS blocks (SSBs) from transmitting UEs 115. That is, the receiving UE 115 may receive SSBs from all transmitting UEs 115 in the vicinity and use the SSBs to decode SCI from the transmitting UEs 115. In some examples, the sidelink resources reserved for the SSB may be located directly before or after the PSCCH in a slot. A problem with such techniques, however, is that the receiving UE 115 may try multiple FFT windows for all SSBs received from the transmitting UEs 115 before decoding the SCIs 210 from the UEs 115 resulting in excess latency and an increase in processing power at the receiving UE 115. As another example, a synchronization preamble may be added immediately before or immediately after the PSCCH (e.g., first stage SCI) in a slot and the receiving UE 115 may use the synchronization preamble to decode the SCI. But to support this technique, a new PSSCH waveform may be needed (e.g., one or more legacy PSSCH waveforms may not be compatible with such a technique).

As described herein, a receiving UE 115 may utilize a reference signal 220 that is multiplexed with the data in the same slot to account for the transmission timing differences between transmitting UEs 115. In some examples, the UEs 115 may receive a configuration message 215 from the base station 105-*a* indicating that a subset of the set of sidelink resources configured for the UE 115 (e.g., resource pool) includes sidelink resources for the reference signal. The subset of resources allocated for the reference signal 220 may be located after the PSCCH and the PSSCH in the time domain of a slot and may span a 2 symbol period. The 2 symbol reference signal may be analogous to the 2 symbol PSFCH.

In one example, the reference signal may include a SS. The SS may, for example, be a primary SS (PSS) or a secondary SS (SSS). The receiving UE 115 may receive SSs over the subset of resources from one or more transmitting UEs 115 within its vicinity and utilize the SSs to decode data in the same slot. For example, the UE 115-*a* may receive a SS from the UE 115-*b* and the UE 115-*c* and utilize the SSs to decode the data message 205-*a*. In some examples, the transmitting UE 115 may select specific resources of the subset of resources based on the subchannel used for transmission of the data message or the transmitting UE (similar to how it is done for PSFCH resource selection). In some examples, the subset of resources allocated for the SS may be associated with some periodicity. For example, the configuration message 215 may indicate that the periodicity of the subset of resources may be 1, 2, or 4 slot. That is, there may be a slot with the subset of resources every 1, 2, or 4 slots within a resource pool (e.g., set of sidelink resources configured for the UE 115).

In another example, the reference signal may be an SRS. SRSs may be useful for resource scheduling, link adaption, beam management, and positioning. The receiving UE 115 may receive one or more SRSs over the subset of resources from one or more transmitting UEs 115 within its vicinity and measure the one or more SRSs to determine the best sidelink beam for communication between the receiving UE 115 and the one or more transmitting UEs 115. Each SRS may occupy 1 or 2 symbols of the subset of resources. That is, the base station 105-*a* may configure the transmitting UE 115 to transmit either a 1-symbol SRS or a 2-symbol SRS. Although the reference signal in this example is described in the context of an SRS, the reference signal may additionally or alternatively be any one of many different types of reference signals, including but not limited to a PT-RS, a frequency tracking reference signal, an AGC acquisition signal, a beam training reference signal, a PRS, a slot aggregation reference signal, a DMRS, a CSI-RS, etc. In some examples, the transmitting UE 115 may select specific resource from the subset of resources allocated for the SRS or the other types of reference signals based on transmitting UE 115 (e.g., source ID) such that different transmitting UEs 115 occupy orthogonal sidelink resources of the subset of resources. Moreover, the subset of resources allocated for the SRS or the other types of reference signals may be associated with some periodicity. For example, the configuration message 215 may indicate that the periodicity of the subset of resources may be 1, 2, 4, 8, or 12 slots. That is, there may be a slot with the subset of resources every 1, 2, 4, 8, or 12 slots within a resource pool (e.g., set of sidelink resources configured for the UE 115).

Using the techniques as described herein may allow the receiving UE to compensate for the transmission timing differences between transmitting UEs 115 thereby allowing the receiving UE 115 to decode SCI and subsequently data messages from the transmitting UEs 115. In addition, the techniques as described herein UE 115 may allow a UE 115 to utilize other types of reference signals which may aid in resource scheduling, link adaption, beam management, positioning, etc.

Figure 3A:
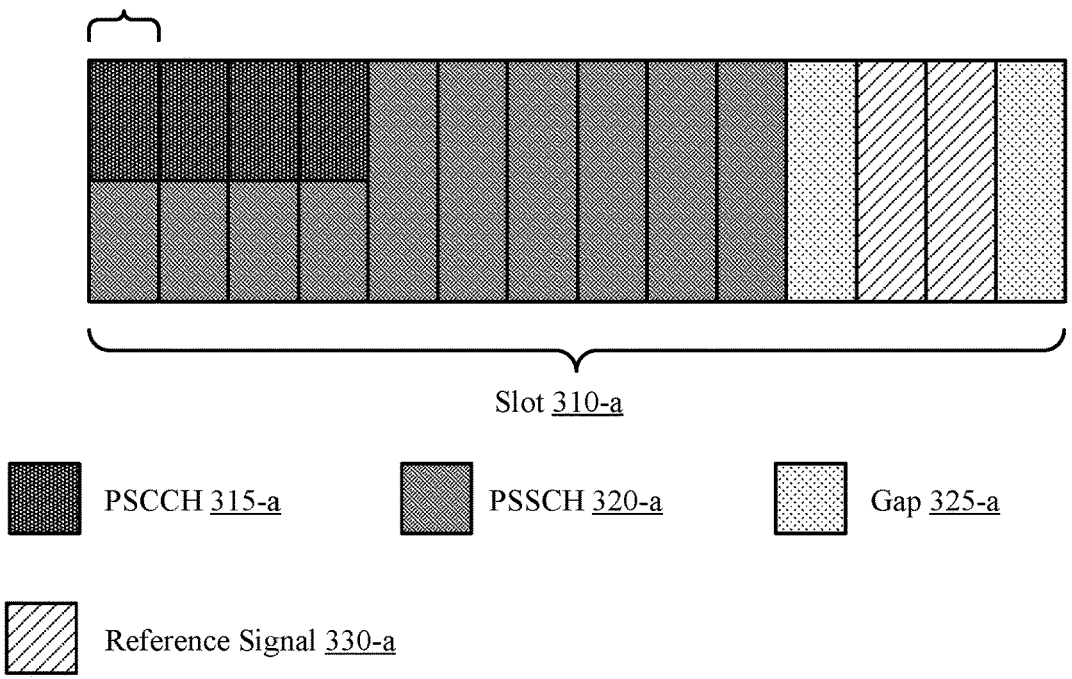
FIGS. 3A and 3B illustrate examples of a slot format that supports short reference signals for sidelink communication in accordance with aspects of the present disclosure.
Figure 3B:
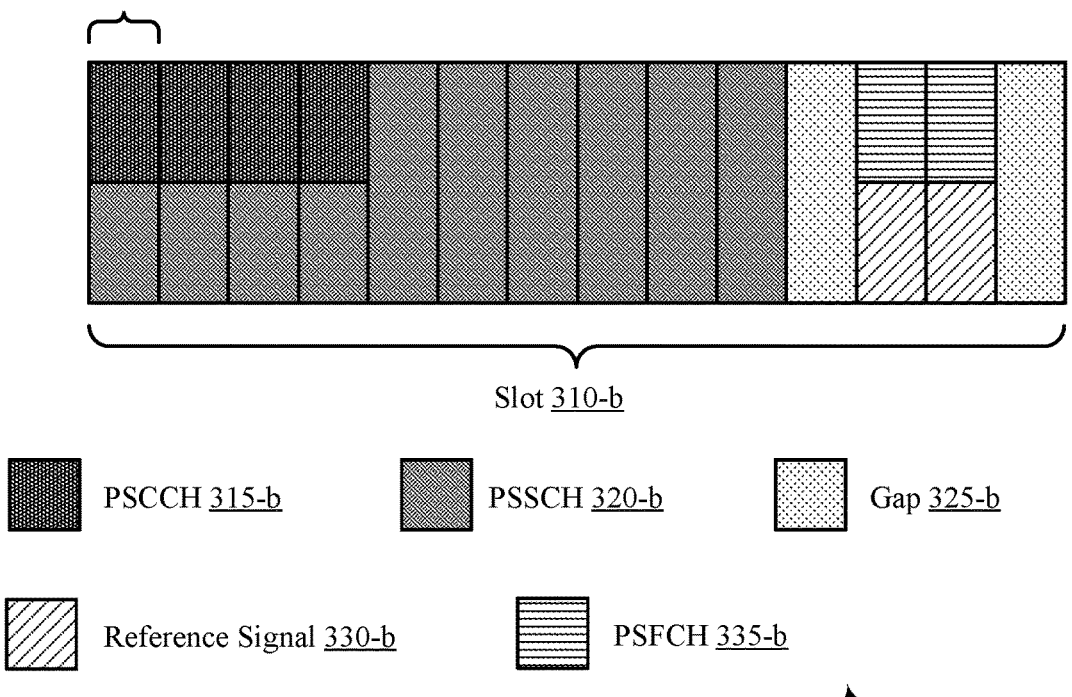

FIGS. 3A and 3B illustrate examples of a slot format 300 (e.g., a slot format 300-a and a slot format 300-b) that supports short reference signals for sidelink communication in accordance with aspects of the present disclosure. In some examples, the slot format 300-a and the slot format 300-b may be implemented by aspects of a wireless communications system 100 and a wireless communications system 200. For example, the slot format 300-a and the slot format 300-b may be implemented by a UE 115 as described with reference to FIGS. 1 and 2.

As described with reference to FIG. 2, in mode 2, a base station may transmit a configuration message to a group of UEs indicating a set of sidelink resources that the UEs may utilize for sidelink transmissions to one another. The set of sidelink resources may be divided into multiple slots 310 and may be further divided into symbols 305. In some examples, a slot 310 may include 14 symbols 305. Sidelink resources of the slot 310 may be reserved for some signal types. For example, as shown in FIG. 3A, a first portion of the sidelink resources of the slot 310-a may be reserved for a PSCCH 315-a (e.g., symbols 0 through 3) and a second portion of the sidelink resources of the slot 310-a may be reserved for PSSCH 320-a (symbols 0 through 9). Similarly, in FIG. 3B, a first portion of the sidelink resources of the slot 310-b may be reserved for a PSCCH 315-b (e.g., symbols 0 through 3) and a second portion of the sidelink resources of the slot 310-b may be reserved for PSSCH 320-b (symbols 0 through 9). The receiving UE may receive SCI over the PSCCH 315 from transmitting UEs and may utilize the SCI to decode data messages received over the PSSCH 320 from the transmitting UEs.

Additionally, as described herein, a portion of the sidelink resources of the slot 310 may be reserved for reference signals 330. For example, as shown in FIG. 3A, a third portion of the sidelink resources may be reserved for reference signals 330-a (e.g., symbols 11 and 12). The sidelink resources reserved for the reference signals 330-a may come after the PSCCH 315-a and the PSSCH 320-a in the time domain and may include all physical resource blocks (PRBs) of a two symbol period. There may be gap 325-a on either side of the of the sidelink resources reserved for the reference signals 330-a, where each gap 325-a may span a period of 1 symbol (e.g., symbols 10 and 13). Similarly, in FIG. 3B, a third portion of the sidelink resources may be reserved for reference signals 330-b (e.g., symbols 11 and 12). The sidelink resources reserved for the reference signals 330-a may come after the PSCCH 315-b and the PSSCH 320-b in the time domain and may include some (but not all) of the PRBs of the two symbol period. The rest of the PRBs of the two symbol period may be reserved for a PSFCH 335-b. In some examples, a number of PRBs that the reference signals 330 may occupy may be preconfigured at the UE. There may be gap 325-b on either side of the of the sidelink resources allocated for the reference signals 330-b, where each gap 325-b may span a period of 1 symbol (e.g., symbols 10 and 13). The receiving UE may receive reference signals from the transmitting UEs and in some examples, may utilize the reference signals 330 to decode the SCI and data messages from the transmitting UEs.

In some examples, the reference signal 330 may be include a SS. The SS may span the 2 symbol period and may be a primary SS or a primary SS. The PSS may be generated using a binary phase-shift keying (BPSK) modulated m-sequence of length 127 and the SSS may be generated using a BPSK modulated gold sequence of length 127. In some examples, shorter version of the PSS or the SSS may be used. In another example, the reference signal 330 may include an SRS. The SRS may span either 1 or 2 symbols. The number of symbols the SRS may span may be preconfigured at the UE. In some examples, the design of the SRS may support a frequency hopping mechanism and variable-sized transmission comb. The transmitting UE may determine the frequency location of the SRS in the sidelink resources reserved for the reference signals 330 based on the source ID (e.g., transmitting UE ID) and in some example, the receiving UE may deduce the source ID based on the frequency location of the SRS.

In another example, the reference signal 330 may any type of general reference signal such as a PT-RS, a frequency tracking reference signal, an AGC signal, a beam training reference signal, a PRS, a slot aggregation reference signals, a DMRS, a CSI-RS, etc. and may span a period of 1 or 2 symbols which may be preconfigured at the UE. The transmitting UE may determine the frequency location of the general reference signal in the sidelink resources reserved the reference signals 330 based on the source ID (e.g., transmitting UE ID) and in some example, the receiving UE may deduce the source ID based on the frequency location of the general reference signal.

Figure 4:
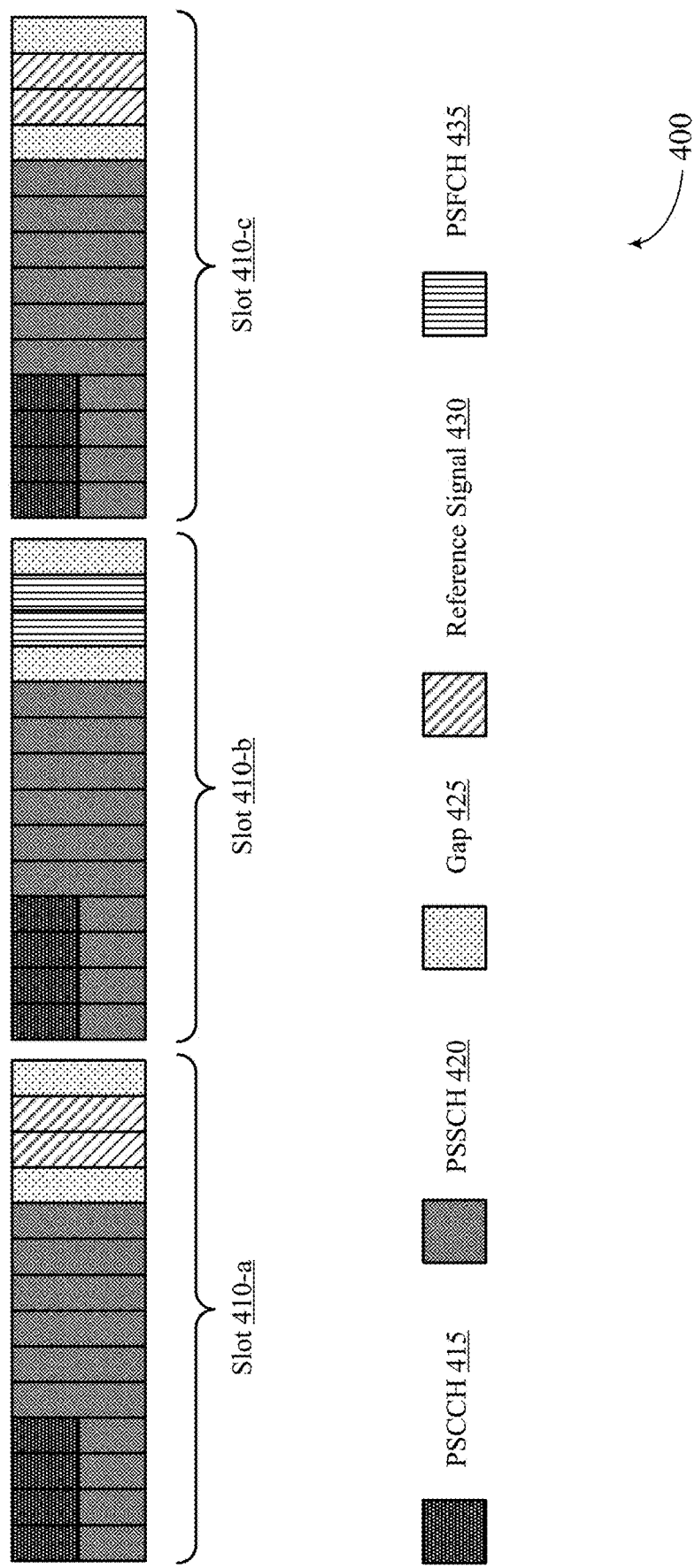
FIG. 4 illustrates an example of a periodic scheme that supports short reference signals for sidelink communication in accordance with aspects of the present disclosure.

FIG. 4 illustrates an example of a periodic scheme 400 that supports short reference signals for sidelink communication in accordance with aspects of the present disclosure. In some examples, the periodic scheme 400 may be implemented by aspects of a wireless communications system 100 and a wireless communications system 200. For example, periodic scheme 400 may be implemented by a UE 115 as described with reference to FIGS. 1 and 2.

As described with reference to FIG. 2, in mode 2, a base station may transmit a configuration message to one or more UEs configuring the one or more UEs with a set of sidelink resources for sidelink transmission between one another. In some examples, the set of sidelink may comprise a set of slots 410 within a subcarrier. As one example, the set of slots 410 may include at least a slot 410-a, a slot 410-b, and a slot 410-c. The sidelink resources of the slot 410 may be divided according to the type of signal received over the sidelink resources. For example, in slot 410-a and slot 410-b, a first portion of the sidelink resources may be reserved for a PSCCH 415, a second portion of the sidelink resources may be reserved for a PSSCH 420, a third portion of the sidelink resources may be reserved for a gap 425 and a fourth portion of the sidelink resources may be reserved for reference signals 430.

But the sidelink resources reserved for the reference signals 430 may not be present in every slot. For example, the sidelink resources reserved for the reference signals 430 may be associated with some periodicity. FIG. 4 illustrates an example where the periodicity is 1. When the periodicity is set to 1, there may be slot 410 that does not include sidelink resources reserved for reference signals 430 in between slots 410 that do include sidelink resources that are reserved for reference signals. For example, a slot 410-b that includes a portion of sidelink resources reserved for PSFCH 435 as opposed to a portion of sidelink resources reserved for reference signals 430 may be between the slot 410-a and the slot 410-c. Other periodicity may be supported. For example, if the reference signal 430 is an example of a SS, the periodicity may be 1, 2, or 4. As another example, if the reference signal 430 is an example of a PT-RS, an AGC signal, a beam training reference signal, a frequency tracking reference signal, a PRS, a slot aggregation reference signals, a DMRS, or a CSI-RS, the periodicity may be 1, 2, 4, 8, or 12. In some examples, the base station may indicate the periodicity associated with sidelink resources reserved for reference signals 430 using the configuration message.

Figure 5:
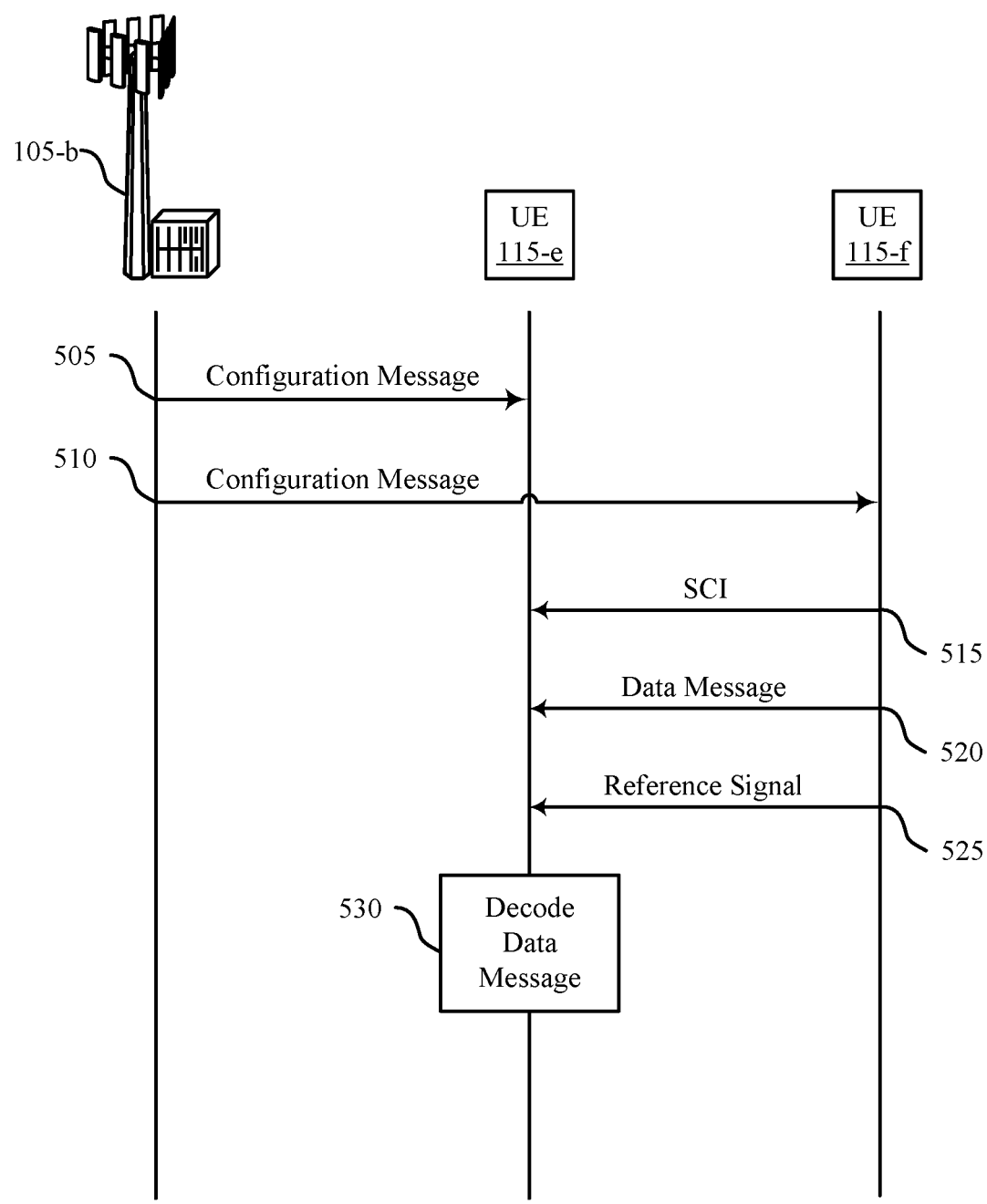
FIG. 5 illustrates an example of a process flow that supports short reference signals for sidelink communication in accordance with aspects of the present disclosure.

FIG. 5 illustrates an example of a process flow 500 that supports short reference signals for sidelink communication in accordance with aspects of the present disclosure. In some examples, the process flow 500 may be implemented by aspects of a wireless communications system 100 and a wireless communications system 200. For example, the process flow 500 may be implemented by a UE 115 as described with reference to FIGS. 1 and 2. Alternative examples of the following may be implemented, where some steps are performed in a different order then described or are not performed at all. In some cases, steps may include additional features not mentioned below, or further steps may be added.

At 505 and 510, the base station 105-b may transmit a configuration message to a set of UEs. For example, the base station 105-b may transmit the configuration message to the UE 115-e and the UE 115-f. In some examples, the configuration message may include a set of sidelink resources that include a set of slots of a subchannel. A subset of the set of slots may include at least a first set of symbols allocated to a PSSCH and at least a first subset of a set of sidelink resources of a second set of slots is allocated to one or more types of reference signals. The first set of symbols may come before the second set of symbols in the time domain and in some examples, the second set of symbols may span 2 symbols. The location of the subset of slots in the set of slot may depend on some periodicity. The periodicity may refer to a quantity of slots between slots of the subset of slots and may be indicated via the configuration message.

At 515, the UE 115-f may transmit SCI to the UE 115-e. The SCI may include resources allocation information. The UE 115-e may additionally receive SCI from other transmitting UEs 115 (not shown in FIG. 5). After transmitting the SCI, the UE 115-f may transmit a data message to the UE 115-e at 520.

At 525, the UE 115-e may receive one or more types of reference signals over at least a portion of the resources of the second set of symbols from transmitting UEs 115. For examples, the UE 115-e may receive a reference signal from the UE 115-f. The one or more types of reference signals may include a SS, an SRS, a PT-RS, a AGC signal, a beam training reference signal, a frequency tracking reference signal, a PRS, a slot aggregation reference signal, a DMRS, or a CSI-RS.

At 530, the UE 115-e may decode the data message received at 520. In some examples, the UE 115-e may decode the data message based on the reference signals received at 525. For example, the UE 115-e may use the reference signals received at 525 to perform time estimation and FFT window adjust in an effort to account for any timing delay when receiving SCI from multiple UEs 115 (e.g., receiving SCI from the UE 115-f and another UE 115).

Figure 6:
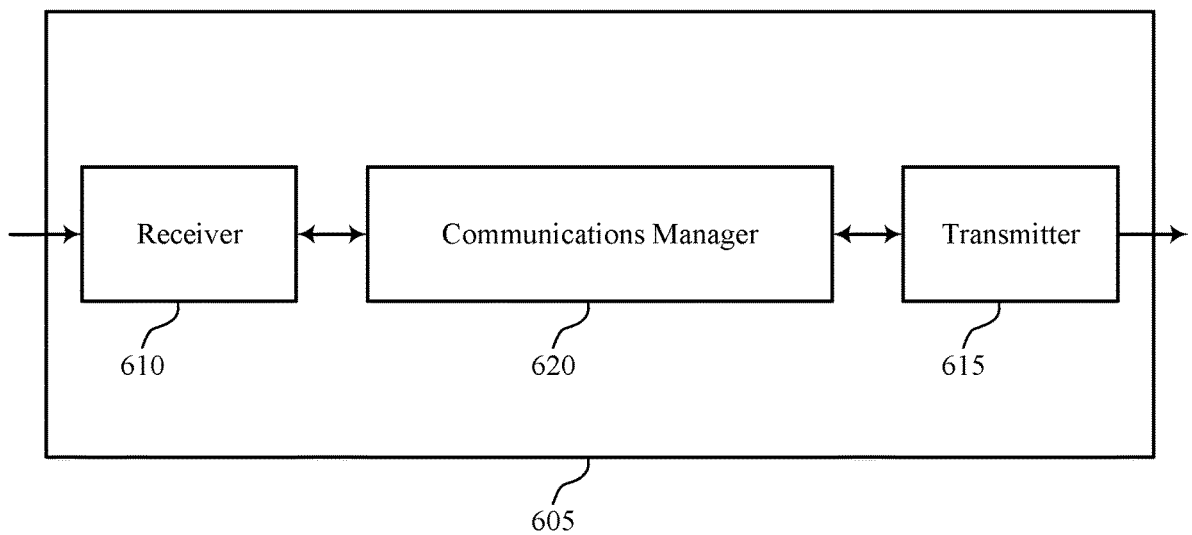
FIGS. 6 and 7 show block diagrams of devices that support short reference signals for sidelink communication in accordance with aspects of the present disclosure.

FIG. 6 shows a block diagram 600 of a device 605 that supports short reference signals for sidelink communication in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to short reference signals for sidelink communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to short reference signals for sidelink communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of short reference signals for sidelink communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The communications manager 620 may be configured as or otherwise support a means for transmitting, to a second wireless device and based on the configuration signaling, a reference signal of the one or more types over at least the subset of resources within the respective second set of symbols of a slot included in the subset of slots.

Additionally or alternatively, the communications manager 620 may support wireless communications at a second wireless device in accordance with examples as disclosed herein. For example, the communications manager 620 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The communications manager 620 may be configured as or otherwise support a means for receiving, from a first wireless device and based on the configuration signaling, a reference signal of the one or more types over at least the subset of resources within the respective second set of symbols of a slot included in the subset of slots.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and reduced power consumption. Unlike other methods, the method as described herein may not require a new PSSCH waveform and as such, the device 605 may conserve processing power when decoding the PSSCH when compared to the other methods. Additionally or alternatively, the methods as described herein may allow a device 605 to receive reference signals from other devices 605 more frequently or in closer temporal proximity to related sidelink signaling. For example, the device 605 may use the reference signals to make timing adjustments when receiving SCI from other devices 605 which may increase the device 605 ability to decode the SCI and related sidelink signals.

Figure 7:
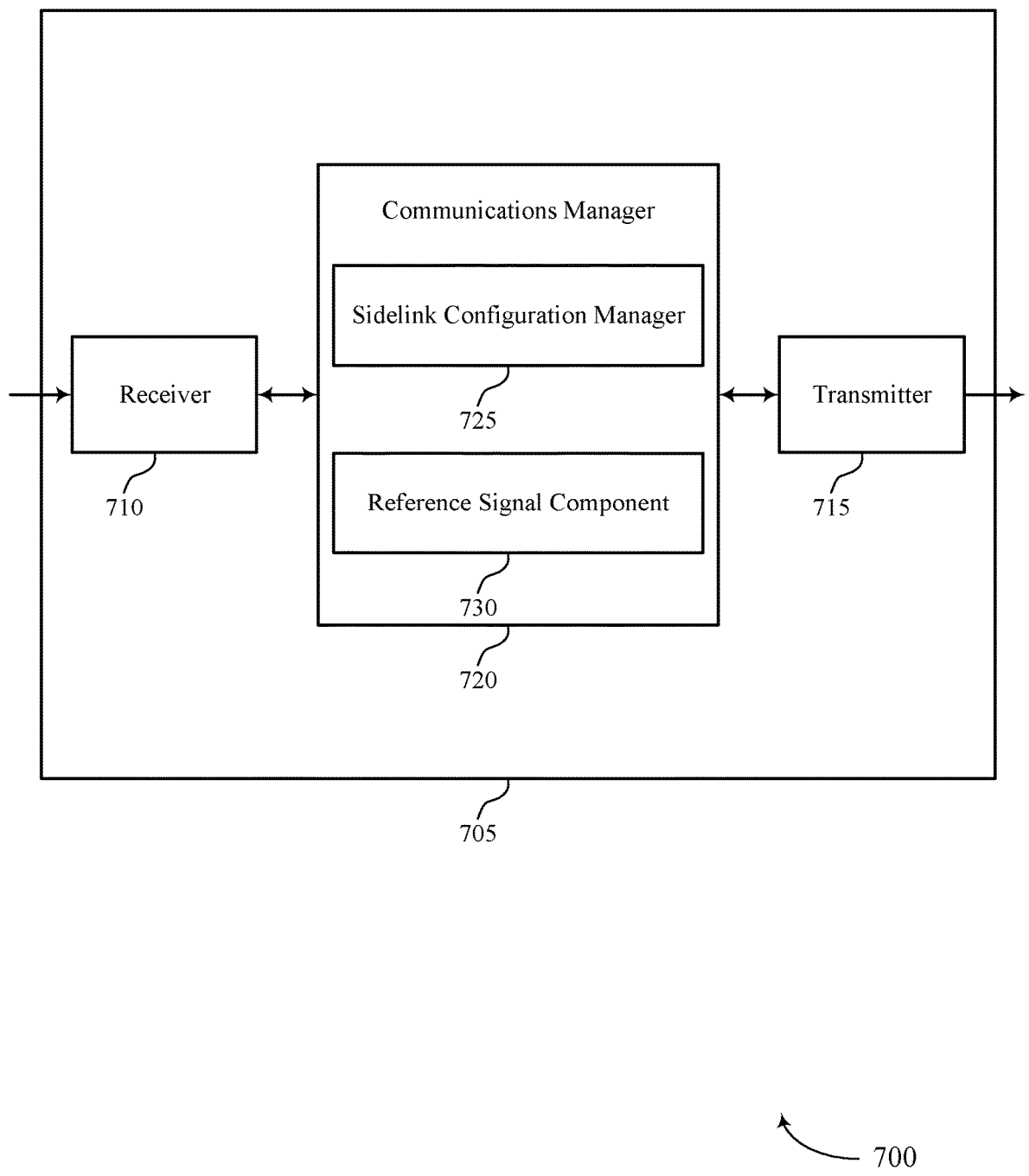

FIG. 7 shows a block diagram 700 of a device 705 that supports short reference signals for sidelink communication in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to short reference signals for sidelink communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to short reference signals for sidelink communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of short reference signals for sidelink communication as described herein. For example, the communications manager 720 may include a sidelink configuration manager 725 a reference signal component 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The sidelink configuration manager 725 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The reference signal component 730 may be configured as or otherwise support a means for transmitting, to a second wireless device and based on the configuration signaling, a reference signal of the one or more types over at least the subset of resources within the respective second set of symbols of a slot included in the subset of slots.

Additionally or alternatively, the communications manager 720 may support wireless communications at a second wireless device in accordance with examples as disclosed herein. The sidelink configuration manager 725 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. The reference signal component 730 may be configured as or otherwise support a means for receiving, from a first wireless device and based on the configuration signaling, a reference signal of the one or more types over at least the subset of resources within the respective second set of symbols of a slot included in the subset of slots.

Figure 8:
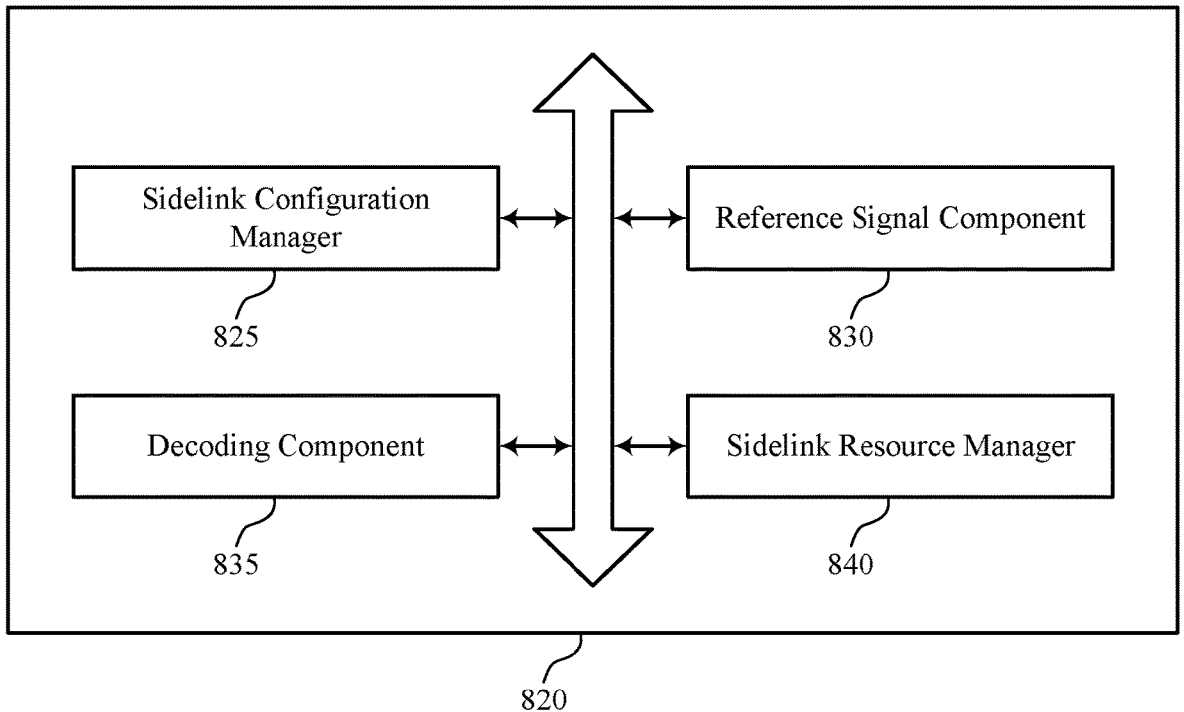
FIG. 8 shows a block diagram of a communications manager that supports short reference signals for sidelink communication in accordance with aspects of the present disclosure.

FIG. 8 shows a block diagram 800 of a communications manager 820 that supports short reference signals for sidelink communication in accordance with aspects of the present disclosure. The communications manager 820 may be an example of aspects of a communications manager 620, a communications manager 720, or both, as described herein. The communications manager 820, or various components thereof, may be an example of means for performing various aspects of short reference signals for sidelink communication as described herein. For example, the communications manager 820 may include a sidelink configuration manager 825, a reference signal component 830, a decoding component 835, a sidelink resource manager 840, or any combination thereof. Each of these components may communicate, directly or indirectly, with one another (e.g., via one or more buses).

The communications manager 820 may support wireless communications at a first wireless device in accordance with examples as disclosed herein. The sidelink configuration manager 825 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The reference signal component 830 may be configured as or otherwise support a means for transmitting, to a second wireless device and based on the configuration signaling, a reference signal of the one or more types over at least the subset of resources within the respective second set of symbols of a slot included in the subset of slots.

In some examples, to support transmitting the reference signal of the one or more types, the reference signal component 830 may be configured as or otherwise support a means for transmitting a SS. In some examples, the SS is generated using an m-sequence, or a gold sequence, or any combination thereof.

In some examples, to support transmitting the reference signal of the one or more types, the reference signal component 830 may be configured as or otherwise support a means for transmitting an SRS, a DMRS, a CSI-RS, a PT-RS, a frequency-tracking reference signal, an AGC acquisition signal, a beam training reference signal, a PRS, or a slot aggregation reference signal.

In some examples, the sidelink resource manager 840 may be configured as or otherwise support a means for determining one or more resources of at least the subset of resources for transmitting the reference signal based on an ID associated with the first UE.

In some examples, a location of the subset of slots within the set of multiple slots is based on a periodicity, the periodicity corresponding to a quantity of slots of a second subset of the set of multiple slots between a first slot of the subset of slots and a second slot of the subset of slots.

In some examples, the respective second set of symbols spans two symbols. In some examples, the subset of the slots each include a respective first gap symbol and a respective second gap symbol, the respective second set of symbols for a slot between the respective first gap symbol and the respective second gap symbol for the slot. In some examples, a second subset of the set of resources of the respective second set of symbols is allocated to a PSFCH.

Additionally or alternatively, the communications manager 820 may support wireless communications at a second wireless device in accordance with examples as disclosed herein. In some examples, the sidelink configuration manager 825 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. In some examples, the reference signal component 830 may be configured as or otherwise support a means for receiving, from a first wireless device and based on the configuration signaling, a reference signal of the one or more types over at least the subset of resources within the respective second set of symbols of a slot included in the subset of slots.

In some examples, the decoding component 835 may be configured as or otherwise support a means for decoding one or more data messages from the first wireless device based on the reference signal. In some examples, to support receiving the reference signal of the one or more types, the reference signal component 830 may be configured as or otherwise support a means for receiving a SS. In some examples, the SS is generated using an m-sequence, or a gold sequence, or any combination thereof.

In some examples, to support receiving the reference signal of the one or more types, the reference signal component 830 may be configured as or otherwise support a means for receiving an SRS, a DMRS, a CSI-RS, a PT-RS, a frequency-tracking reference signal, an AGC acquisition signal, a beam training reference signal, a PRS, or a slot aggregation reference signal.

In some examples, the sidelink resource manager 840 may be configured as or otherwise support a means for determining one or more resources of at least the subset of resources for transmitting the reference signal based on an ID associated with the first UE.

In some examples, a location of the subset of slots within the set of multiple slots is based on a periodicity, the periodicity corresponding to a quantity of slots of a second subset of the set of multiple slots between a first slot of the subset of slots and a second slot of the subset of slots.

In some examples, the respective second set of symbols spans two symbols.

In some examples, the subset of the slots each include a respective first gap symbol and a respective second gap symbol, the respective second set of symbols for a slot between the respective first gap symbol and the respective second gap symbol for the slot.

In some examples, a second subset of the set of resources of the respective second set of symbols is allocated to a PSFCH.

Figure 9:
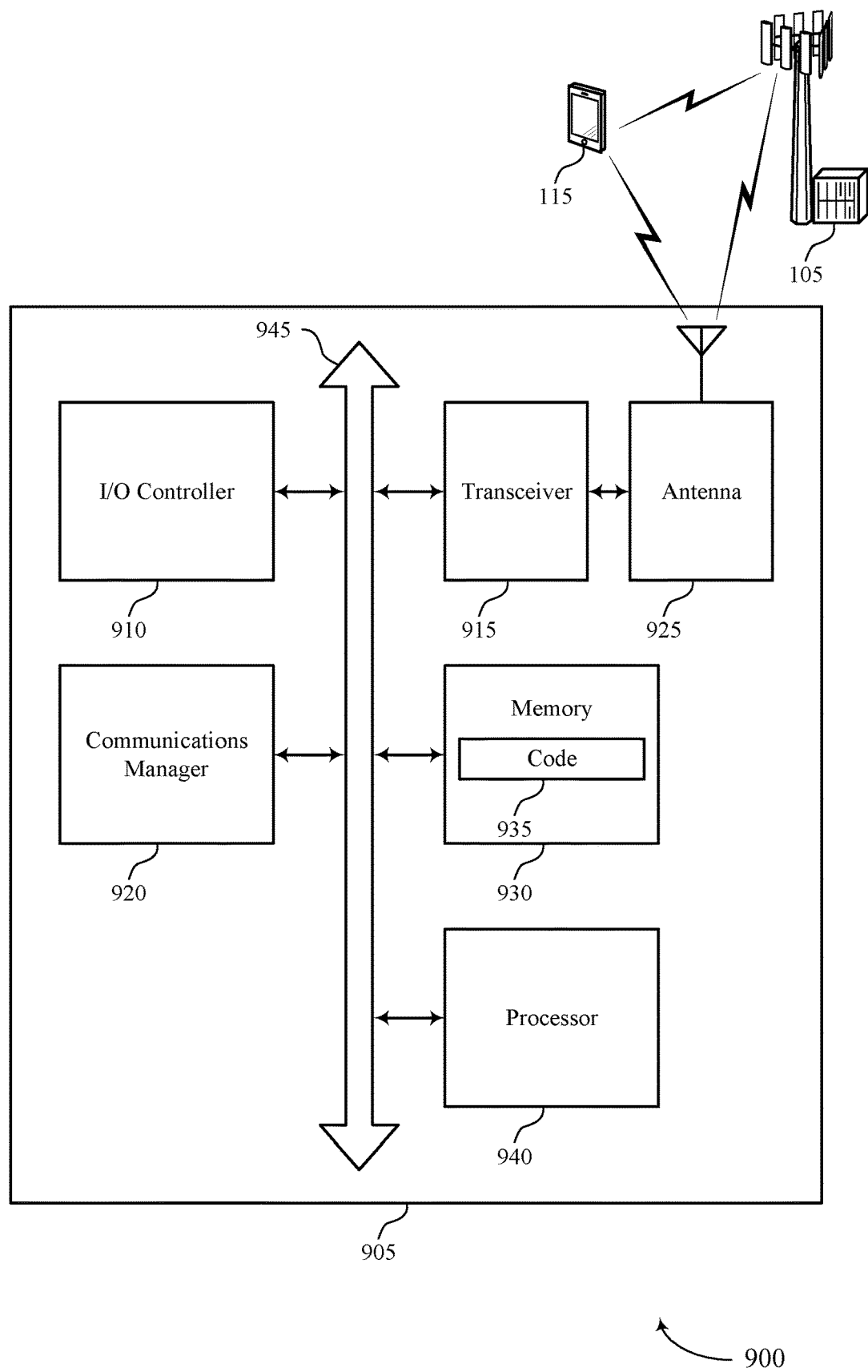
FIG. 9 shows a diagram of a system including a device that supports short reference signals for sidelink communication in accordance with aspects of the present disclosure.

FIG. 9 shows a diagram of a system 900 including a device 905 that supports short reference signals for sidelink communication in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting short reference signals for sidelink communication). For example, the device 905 or a component of the device 905 may include a processor 940 and memory 930 coupled to the processor 940, the processor 940 and memory 930 configured to perform various functions described herein.

The communications manager 920 may support wireless communications at a first wireless device in accordance with examples as disclosed herein. For example, the communications manager 920 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The communications manager 920 may be configured as or otherwise support a means for transmitting, to a second wireless device and based on the configuration signaling, a reference signal of the one or more types over at least the subset of resources within the respective second set of symbols of a slot included in the subset of slots.

Additionally or alternatively, the communications manager 920 may support wireless communications at a second wireless device in accordance with examples as disclosed herein. For example, the communications manager 920 may be configured as or otherwise support a means for receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. The communications manager 920 may be configured as or otherwise support a means for receiving, from a first wireless device and based on the configuration signaling, a reference signal of the one or more types over at least the subset of resources within the respective second set of symbols of a slot included in the subset of slots.

By including or configuring the communications manager 920 in accordance with examples as described herein, the device 905 may support techniques for improved communication reliability and improved coordination between devices. Unlike other methods (e.g., using SSBs for sidelink timing adjustments), the methods described herein may allow the device 905 to receive reference signals frequently (e.g., in every slot or every few slots) which may increase the ability of the device 905 to make accurate timing adjustments (accurate FFT window adjustments) or otherwise support improved performance when decoding SCI or other sidelink signals from multiple other devices 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of short reference signals for sidelink communication as described herein, or the processor 940 and the memory 930 may be otherwise configured to perform or support such operations.

Figure 10:
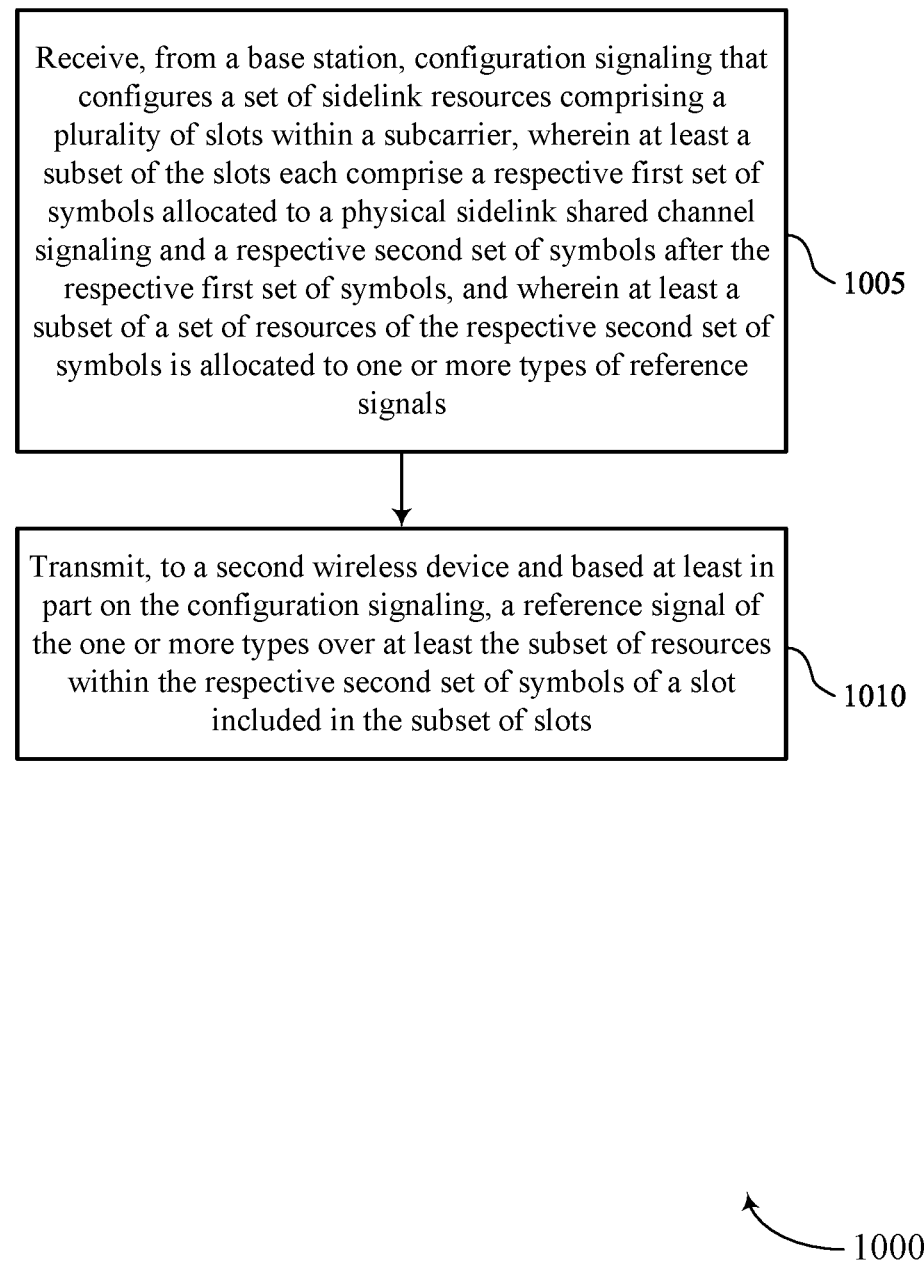
FIGS. 10 through 15 show flowcharts illustrating methods that support short reference signals for sidelink communication in accordance with aspects of the present disclosure.

FIG. 10 shows a flowchart illustrating a method 1000 that supports short reference signals for sidelink communication in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The operations of 1005 may be performed in accordance with examples as disclosed herein. In some examples, aspects of the operations of 1005 may be performed by a sidelink configuration manager 825 as described with reference to FIG. 8.

At 1010, the method may include transmitting, to a second wireless device and based on the configuration signaling, a reference signal of the one or more types over at least the subset of resources within the respective second set of symbols of a slot included in the subset of slots. The operations of 1010 may be performed in accordance with examples as disclosed herein. In some examples, aspects of the operations of 1010 may be performed by a reference signal component 830 as described with reference to FIG. 8.

Figure 11:
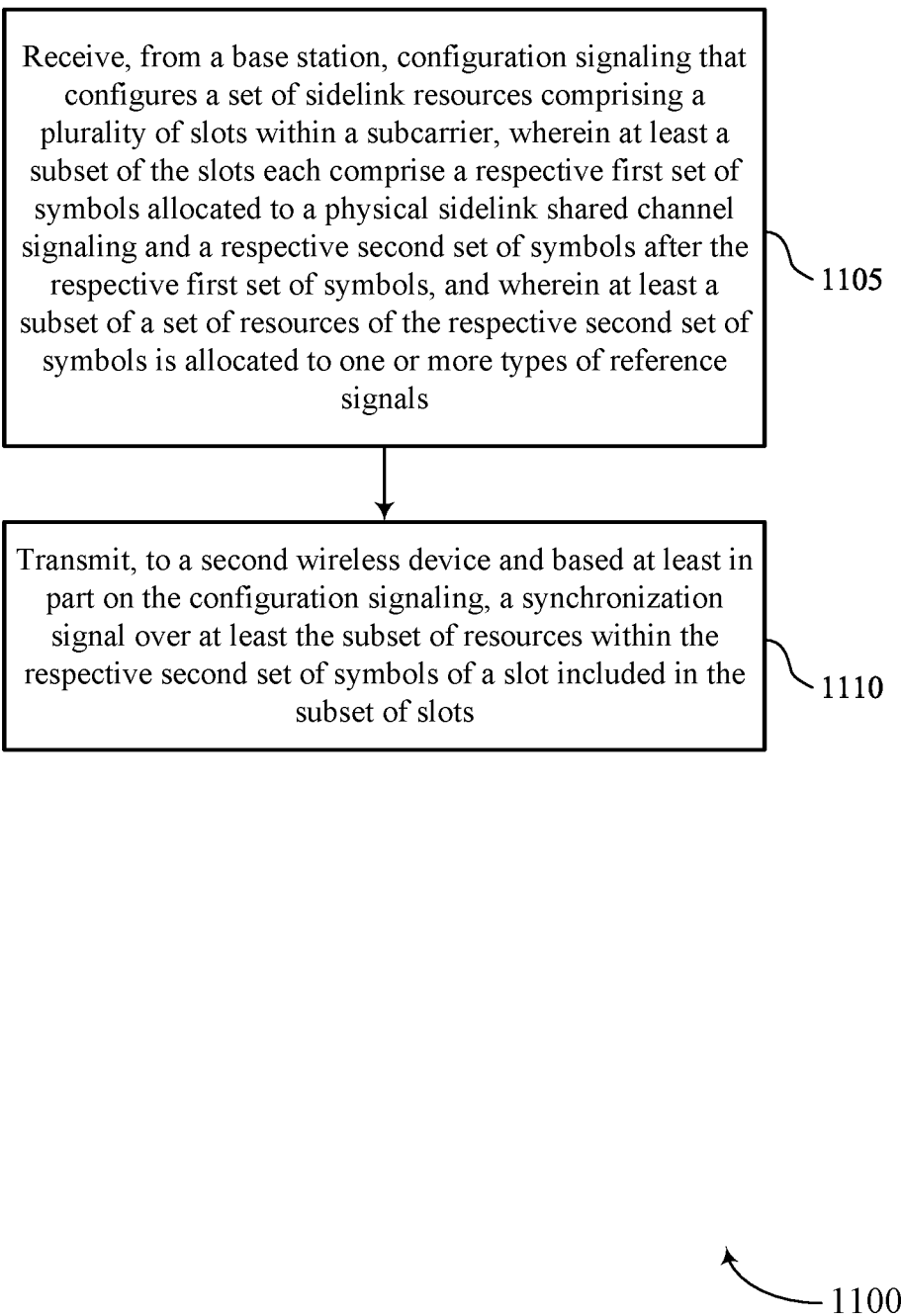

FIG. 11 shows a flowchart illustrating a method 1100 that supports short reference signals for sidelink communication in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The operations of 1105 may be performed in accordance with examples as disclosed herein. In some examples, aspects of the operations of 1105 may be performed by a sidelink configuration manager 825 as described with reference to FIG. 8.

At 1110, the method may include transmitting, to a second wireless device and based on the configuration signaling, a SS over at least the subset of resources within the respective second set of symbols of a slot included in the subset of slots. The operations of 1110 may be performed in accordance with examples as disclosed herein. In some examples, aspects of the operations of 1110 may be performed by a reference signal component 830 as described with reference to FIG. 8.

Figure 12:
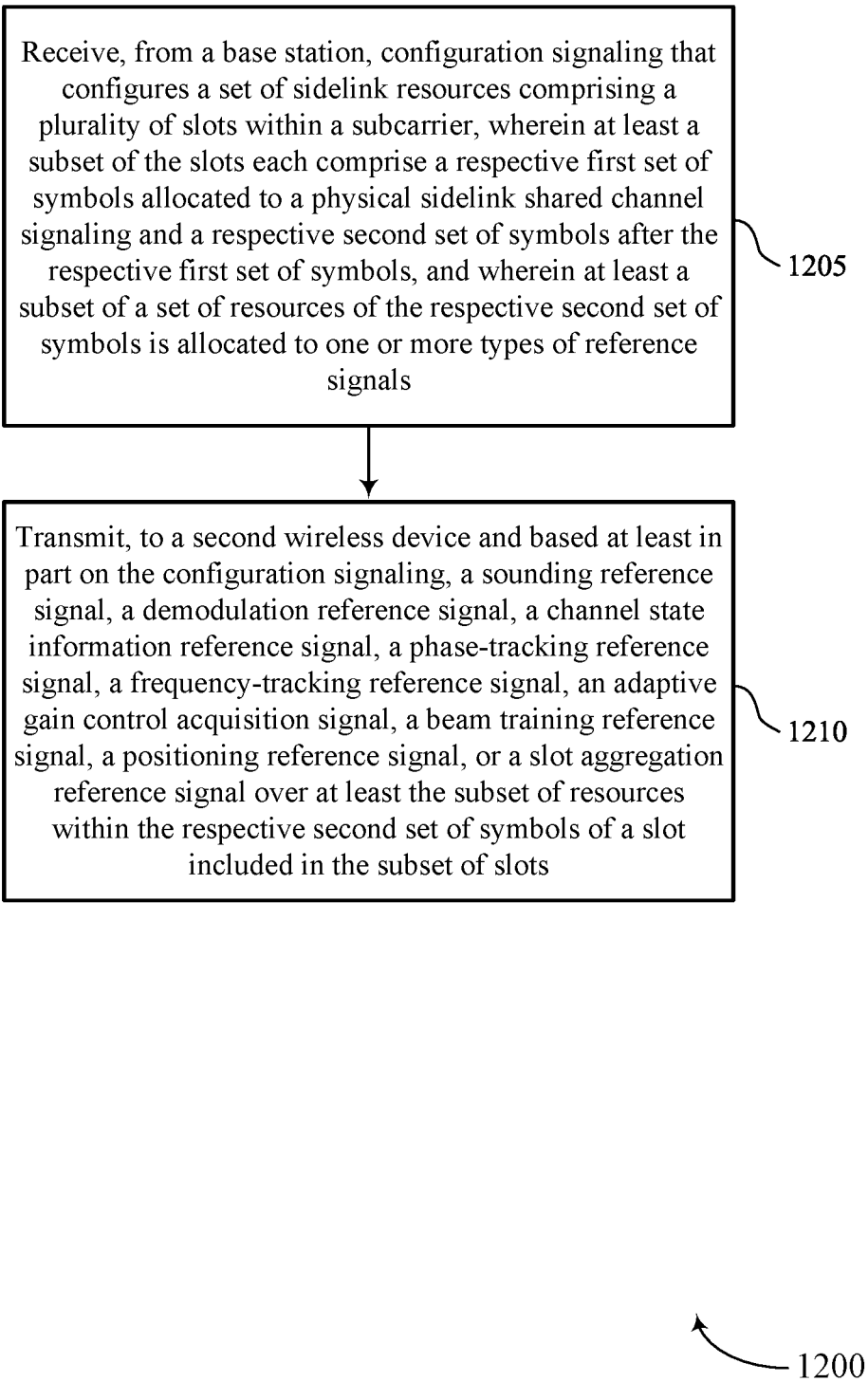

FIG. 12 shows a flowchart illustrating a method 1200 that supports short reference signals for sidelink communication in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective second set of symbols is allocated to one or more types of reference signals. The operations of 1205 may be performed in accordance with examples as disclosed herein. In some examples, aspects of the operations of 1205 may be performed by a sidelink configuration manager 825 as described with reference to FIG. 8.

At 1210, the method may include transmitting, to a second wireless device and based on the configuration signaling, an SRS, a DMRS, a CSI-RS, a PT-RS, a frequency-tracking reference signal, an AGC acquisition signal, a beam training reference signal, a PRS, or a slot aggregation reference signal over at least the subset of resources within the respective second set of symbols of a slot included in the subset of slots. The operations of 1210 may be performed in accordance with examples as disclosed herein. In some examples, aspects of the operations of 1210 may be performed by a reference signal component 830 as described with reference to FIG. 8.

Figure 13:
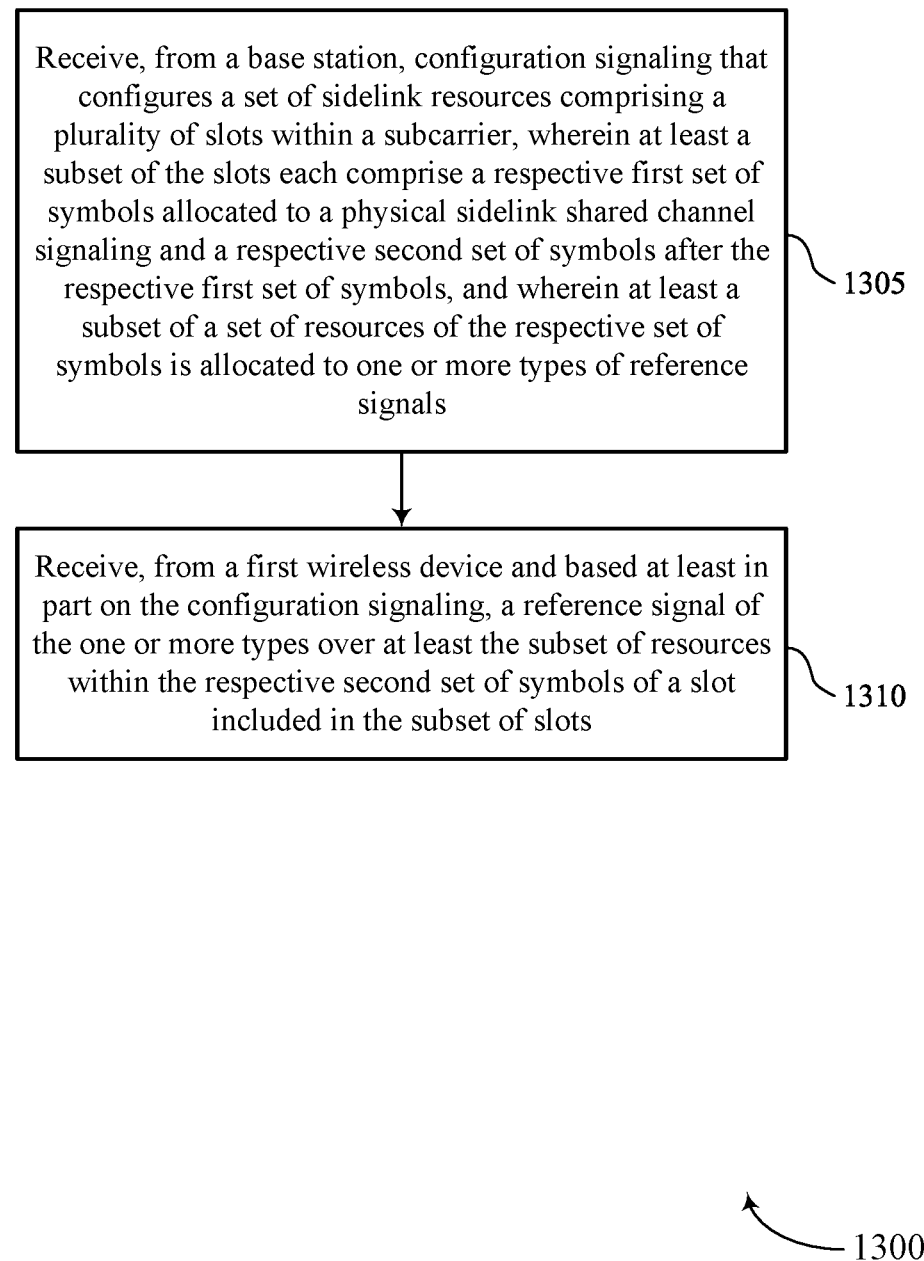

FIG. 13 shows a flowchart illustrating a method 1300 that supports short reference signals for sidelink communication in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. The operations of 1305 may be performed in accordance with examples as disclosed herein. In some examples, aspects of the operations of 1305 may be performed by a sidelink configuration manager 825 as described with reference to FIG. 8.

At 1310, the method may include receiving, from a first wireless device and based on the configuration signaling, a reference signal of the one or more types over at least the subset of resources within the respective second set of symbols of a slot included in the subset of slots. The operations of 1310 may be performed in accordance with examples as disclosed herein. In some examples, aspects of the operations of 1310 may be performed by a reference signal component 830 as described with reference to FIG. 8.

Figure 14:
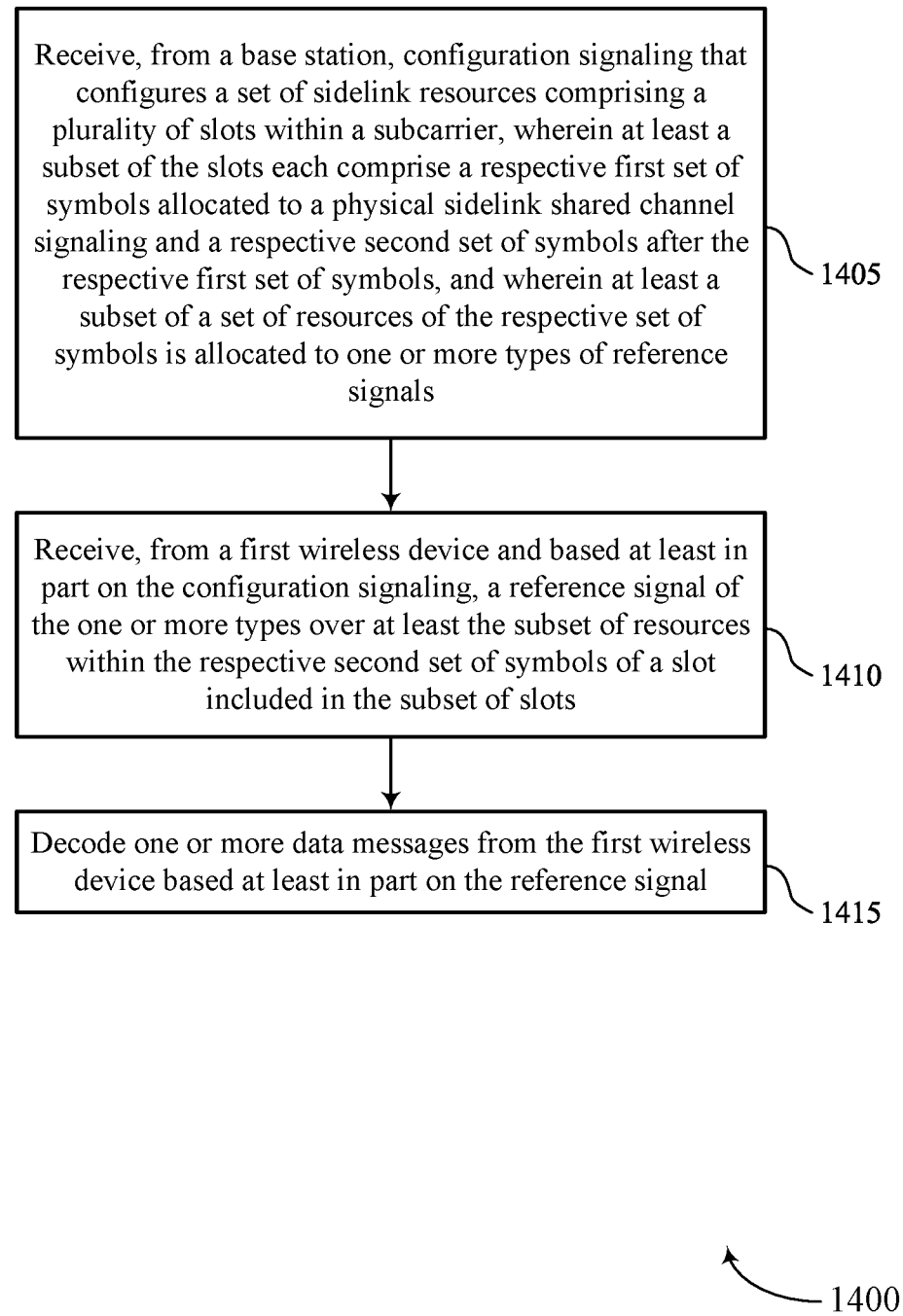

FIG. 14 shows a flowchart illustrating a method 1400 that supports short reference signals for sidelink communication in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. The operations of 1405 may be performed in accordance with examples as disclosed herein. In some examples, aspects of the operations of 1405 may be performed by a sidelink configuration manager 825 as described with reference to FIG. 8.

At 1410, the method may include receiving, from a first wireless device and based on the configuration signaling, a reference signal of the one or more types over at least the subset of resources within the respective second set of symbols of a slot included in the subset of slots. The operations of 1410 may be performed in accordance with examples as disclosed herein. In some examples, aspects of the operations of 1410 may be performed by a reference signal component 830 as described with reference to FIG. 8.

At 1415, the method may include decoding one or more data messages from the first wireless device based on the reference signal. The operations of 1415 may be performed in accordance with examples as disclosed herein. In some examples, aspects of the operations of 1415 may be performed by a decoding component 835 as described with reference to FIG. 8.

Figure 15:
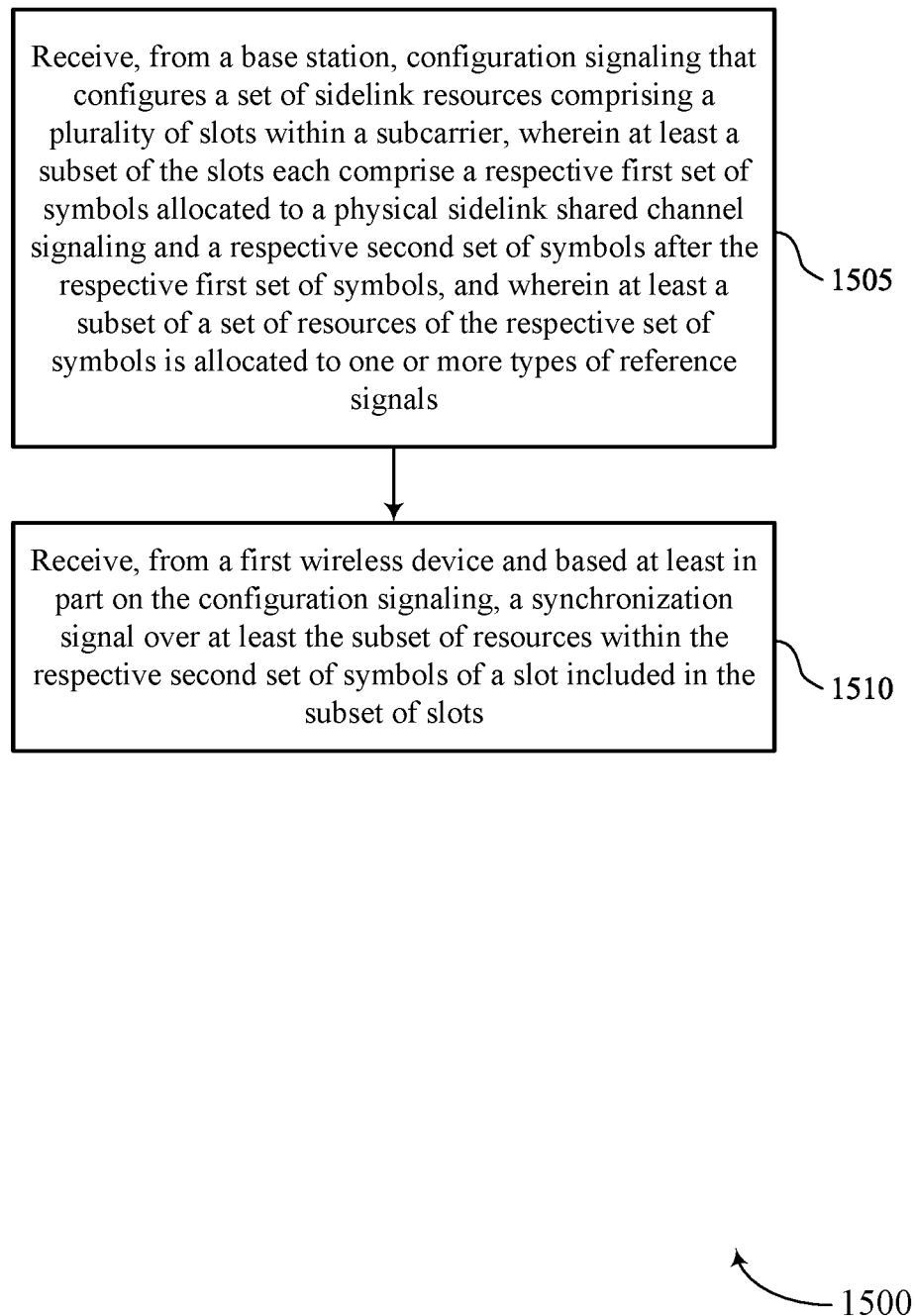

FIG. 15 shows a flowchart illustrating a method 1500 that supports short reference signals for sidelink communication in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, configuration signaling that configures a set of sidelink resources including a set of multiple slots within a subcarrier, where at least a subset of the slots each include a respective first set of symbols allocated to a PSSCH signaling and a respective second set of symbols after the respective first set of symbols, and where at least a subset of a set of resources of the respective set of symbols is allocated to one or more types of reference signals. The operations of 1505 may be performed in accordance with examples as disclosed herein. In some examples, aspects of the operations of 1505 may be performed by a sidelink configuration manager 825 as described with reference to FIG. 8.

At 1510, the method may include receiving, from a first wireless device and based on the configuration signaling, a SS over at least the subset of resources within the respective second set of symbols of a slot included in the subset of slots. The operations of 1510 may be performed in accordance with examples as disclosed herein. In some examples, aspects of the operations of 1510 may be performed by a reference signal component 830 as described with reference to FIG. 8.

The following provides an overview of aspects of the present disclosure:

Aspect 1: A method for wireless communications at a first wireless device, comprising: receiving, from a base station, configuration signaling that configures a set of sidelink resources comprising a plurality of slots within a subcarrier, wherein at least a subset of the slots each comprise a respective first set of symbols allocated to a PSSCH signaling and a respective second set of symbols after the respective first set of symbols, and wherein at least a subset of a set of resources of the respective second set of symbols is allocated to one or more types of reference signals; and transmitting, to a second wireless device and based at least in part on the configuration signaling, a reference signal of the one or more types over at least the subset of resources within the respective second set of symbols of a slot included in the subset of slots.

Aspect 2: The method of aspect 1, wherein transmitting the reference signal of the one or more types comprises: transmitting an SS.

Aspect 3: The method of aspect 2, wherein the SS is generated using an m-sequence, or a gold sequence, or any combination thereof.

Aspect 4: The method of aspect 1, wherein transmitting the reference signal of the one or more types comprises:

transmitting an SRS, a DMRS, a CSI-RS, a PT-RS, a frequency-tracking reference signal, an AGC acquisition signal, a beam training reference signal, a PRS, or a slot aggregation reference signal.

Aspect 5: The method of aspect 4, further comprising: determining one or more resources of at least the subset of resources for transmitting the reference signal based at least in part on an ID associated with the first UE.

Aspect 6: The method of any of aspects 1 through 5, wherein a location of the subset of slots within the plurality of slots is based at least in part on a periodicity, the periodicity corresponding to a quantity of slots of a second subset of the plurality of slots between a first slot of the subset of slots and a second slot of the subset of slots.

Aspect 7: The method of any of aspects 1 through 6, wherein the respective second set of symbols spans two symbols.

Aspect 8: The method of any of aspects 1 through 7, wherein the subset of the slots each comprise a respective first gap symbol and a respective second gap symbol, the respective second set of symbols for a slot between the respective first gap symbol and the respective second gap symbol for the slot.

Aspect 9: The method of any of aspects 1 through 8, wherein a second subset of the set of resources of the respective second set of symbols is allocated to a PSFCH.

Aspect 10: A method for wireless communications at a second wireless device, comprising: receiving, from a base station, configuration signaling that configures a set of sidelink resources comprising a plurality of slots within a subcarrier, wherein at least a subset of the slots each comprise a respective first set of symbols allocated to a PSSCH signaling and a respective second set of symbols after the respective first set of symbols, and wherein at least a subset of a set of resources of the respective set of symbols is allocated to one or more types of reference signals; and receiving, from a first wireless device and based at least in part on the configuration signaling, a reference signal of the one or more types over at least the subset of resources within the respective second set of symbols of a slot included in the subset of slots.

Aspect 11: The method of aspect 10, further comprising: decoding one or more data messages from the first wireless device based at least in part on the reference signal.

Aspect 12: The method of any of aspects 10 through 11, wherein receiving the reference signal of the one or more types comprises: receiving an SS.

Aspect 13: The method of aspect 12, wherein the SS is generated using an m-sequence, or a gold sequence, or any combination thereof.

Aspect 14: The method of aspect 10, wherein receiving the reference signal of the one or more types comprises: receiving an SRS, a DMRS, a CSI-RS, a PT-RS, a frequency-tracking reference signal, an AGC acquisition signal, a beam training reference signal, a PRS, or a slot aggregation reference signal.

Aspect 15: The method of aspect 14, further comprising: determining one or more resources of at least the subset of resources for transmitting the reference signal based at least in part on an ID associated with the first UE.

Aspect 16: The method of any of aspects 10 through 15, wherein a location of the subset of slots within the plurality of slots is based at least in part on a periodicity, the periodicity corresponding to a quantity of slots of a second subset of the plurality of slots between a first slot of the subset of slots and a second slot of the subset of slots.

Aspect 17: The method of any of aspects 10 through 16, wherein the respective second set of symbols spans two symbols.

Aspect 18: The method of any of aspects 10 through 17, wherein the subset of the slots each comprise a respective first gap symbol and a respective second gap symbol, the respective second set of symbols for a slot between the respective first gap symbol and the respective second gap symbol for the slot.

Aspect 19: The method of any of aspects 10 through 18, wherein a second subset of the set of resources of the respective second set of symbols is allocated to a PSFCH.

Aspect 20: An apparatus for wireless communications at a first wireless device, comprising a processor; memory coupled with the processor; and instructions stored in the memory and executable by the processor to cause the apparatus to perform a method of any of aspects 1 through 9.

Aspect 21: An apparatus for wireless communications at a first wireless device, comprising at least one means for performing a method of any of aspects 1 through 9.

Aspect 22: A non-transitory computer-readable medium storing code for wireless communications at a first wireless device, the code comprising instructions executable by a processor to perform a method of any of aspects 1 through 9.

Aspect 23: An apparatus for wireless communications at a second wireless device, comprising a processor; memory coupled with the processor; and instructions stored in the memory and executable by the processor to cause the apparatus to perform a method of any of aspects 10 through 19.

Aspect 24: An apparatus for wireless communications at a second wireless device, comprising at least one means for performing a method of any of aspects 10 through 19.

Aspect 25: A non-transitory computer-readable medium storing code for wireless communications at a second wireless device, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, from a network device, configuration signaling that configures a set of sidelink resources comprising a plurality of slots within a subcarrier,
   wherein at least a subset of the slots each comprise a respective first set of symbols allocated to a physical sidelink shared channel (PSSCH) and a respective second set of symbols after the respective first set of symbols, and wherein the respective second set of symbols is allocated to one or more types of reference signals;
   transmitting, to a second wireless device and based at least in part on the configuration signaling, a data within the respective first set of symbols of a slot included in the subset of the slots and allocated to the PSSCH;
   selecting at least a subset of resources within the respective second set of symbols of the slot for transmission of a reference signal of one or more types of reference signals based at least in part on an identifier associated with the first wireless device; and transmitting, to the second wireless device and based at least in part on the configuration signaling, the reference signal via the at least subset of resources, wherein the slot does not include any symbol allocated to a physical sidelink feedback channel (PSFCH).

2. The method of claim 1, wherein transmitting the reference signal of the one or more types of reference signals comprises:
transmitting a synchronization signal.

3. The method of claim 2, wherein the synchronization signal is generated using an m-sequence, or a gold sequence, or any combination thereof.

4. The method of claim 1, wherein transmitting the reference signal of the one or more types of reference signals comprises:
transmitting a sounding reference signal, a demodulation reference signal, a channel state information reference signal, a phase-tracking reference signal, a frequency-tracking reference signal, an adaptive gain control acquisition signal, a beam training reference signal, a positioning reference signal, or a slot aggregation reference signal.

5. The method of claim 1, wherein a location of the subset of the slots within the plurality of slots is based at least in part on a periodicity, the periodicity corresponding to a quantity of slots of a second subset of the plurality of slots between a first slot of the subset of the slots and a second slot of the subset of the slots.

6. The method of claim 1, wherein the respective second set of symbols spans two symbols.

7. The method of claim 1, wherein the subset of the slots each comprise a respective first gap symbol and a respective second gap symbol, the respective second set of symbols for a slot between the respective first gap symbol and the respective second gap symbol for the slot.

8. An apparatus for wireless communications at a first wireless device, comprising:
one or more processors;
memory coupled with the one or more processors; and
instructions stored in the memory and executable by the one or more processors to cause the apparatus to:
receive, from a network device, configuration signaling that configures a set of sidelink resources comprising a plurality of slots within a subcarrier,
wherein at least a subset of the slots each comprise a respective first set of symbols allocated to a physical sidelink shared channel (PSSCH) and a respective second set of symbols after the respective first set of symbols, and wherein the respective second set of symbols is allocated to one or more types of reference signals;
transmit, to a second wireless device and based at least in part on the configuration signaling, a data within the respective first set of symbols of a slot included in the subset of the slots and allocated to the PSSCH;
select at least a subset of resources within the respective second set of symbols of the slot for transmission of a reference signal of one or more types of reference signals based at least in part on an identifier associated with the first wireless device; and
transmit, to the second wireless device and based at least in part on the configuration signaling, the reference signal via the at least subset of resources, wherein the slot does not include any symbol allocated to a physical sidelink feedback channel (PSFCH).

9. The apparatus of claim 8, wherein, to transmit the reference signal of the one or more types of reference signals, the instructions are executable by the one or more processors to cause the apparatus to:
transmit a synchronization signal.

10. The apparatus of claim 9, wherein the synchronization signal is generated using an m-sequence, or a gold sequence, or any combination thereof.

11. The apparatus of claim 8, wherein, to transmit the reference signal of the one or more types of reference signals, the instructions are executable by the one or more processors to cause the apparatus to:
transmit a sounding reference signal, a demodulation reference signal, a channel state information reference signal, a phase-tracking reference signal, a frequency-tracking reference signal, an adaptive gain control acquisition signal, a beam training reference signal, a positioning reference signal, or a slot aggregation reference signal.

12. The apparatus of claim 8, wherein a location of the subset of the slots within the plurality of slots is based at least in part on a periodicity, the periodicity corresponding to a quantity of slots of a second subset of the plurality of slots between a first slot of the subset of the slots and a second slot of the subset of the slots.

13. The apparatus of claim 8, wherein the respective second set of symbols spans two symbols.

14. The apparatus of claim 8, wherein the subset of the slots each comprise a respective first gap symbol and a respective second gap symbol, the respective second set of symbols for a slot between the respective first gap symbol and the respective second gap symbol for the slot.

15. A non-transitory computer-readable medium storing code for wireless communications at a first wireless device, the code comprising instructions executable by a processor to:
receive, from a network device, configuration signaling that configures a set of sidelink resources comprising a plurality of slots within a subcarrier,
wherein at least a subset of the slots each comprise a respective first set of symbols allocated to a physical sidelink shared channel (PSSCH) and a respective second set of symbols after the respective first set of symbols, and wherein the respective second set of symbols is allocated to one or more types of reference signals;
transmit, to a second wireless device and based at least in part on the configuration signaling, a data within the respective first set of symbols of a slot included in the subset of the slots and allocated to the PSSCH;
select at least a subset of resources within the respective second set of symbols of the slot for transmission of a reference signal of one or more types of reference signals based at least in part on an identifier associated with the first wireless device; and
transmit, to the second wireless device and based at least in part on the configuration signaling, the reference signal via the at least subset of resources, wherein the slot does not include any symbol allocated to a physical sidelink feedback channel (PSFCH).

16. The non-transitory computer-readable medium of claim 15, wherein, to transmit the reference signal of the one or more types, the instructions are executable by the processor to:
transmit a synchronization signal.

17. The non-transitory computer-readable medium of claim 16, wherein the synchronization signal is generated using an m-sequence, or a gold sequence, or any combination thereof.

18. The non-transitory computer-readable medium of claim 15, wherein, to transmit the reference signal of the one or more types, the instructions are executable by the processor to:

transmit a sounding reference signal, a demodulation reference signal, a channel state information reference signal, a phase-tracking reference signal, a frequency-tracking reference signal, an adaptive gain control acquisition signal, a beam training reference signal, a positioning reference signal, or a slot aggregation reference signal.

19. The non-transitory computer-readable medium of claim 15, wherein a location of the subset of the slots within the plurality of slots is based at least in part on a periodicity, the periodicity corresponding to a quantity of slots of a second subset of the plurality of slots between a first slot of the subset of the slots and a second slot of the subset of the slots.

20. The non-transitory computer-readable medium of claim 15, wherein:

the respective second set of symbols spans two symbols.

21. The non-transitory computer-readable medium of claim 15, wherein the subset of the slots each comprise a respective first gap symbol and a respective second gap symbol, the respective second set of symbols for a slot between the respective first gap symbol and the respective second gap symbol for the slot.

22. An apparatus for wireless communications at a first wireless device, comprising:

means for receiving, from a network device, configuration signaling that configures a set of sidelink resources comprising a plurality of slots within a subcarrier, wherein at least a subset of the slots each comprise a respective first set of symbols allocated to a physical sidelink shared channel (PSSCH) and a respective second set of symbols after the respective first set of symbols, and wherein the respective second set of symbols is allocated to one or more types of reference signals;

means for transmitting, to a second wireless device and based at least in part on the configuration signaling, a data within the respective first set of symbols of a slot included in the subset of the slots and allocated to the PSSCH;

means for determining at least a subset of resources within the respective second set of symbols of the slot for transmission of a reference signal of one or more types of reference signals based at least in part on an identifier associated with the first wireless device; and means for transmitting, to the second wireless device and based at least in part on the configuration signaling, the reference signal via the at least subset of resources, wherein the slot does not include any symbol allocated to a physical sidelink feedback channel (PSFCH).

23. The apparatus of claim 22, wherein the means for transmitting the reference signal of the one or more types comprise:

means for transmitting a synchronization signal.

24. The apparatus of claim 22, wherein the means for transmitting the reference signal of the one or more types comprise:

means for transmitting a sounding reference signal, a demodulation reference signal, a channel state information reference signal, a phase-tracking reference signal, a frequency-tracking reference signal, an adaptive gain control acquisition signal, a beam training reference signal, a positioning reference signal, or a slot aggregation reference signal.

25. The apparatus of claim 22, wherein a location of the subset of the slots within the plurality of slots is based at least in part on a periodicity, the periodicity corresponding to a quantity of slots of a second subset of the plurality of slots between a first slot of the subset of the slots and a second slot of the subset of the slots.

26. The apparatus of claim 22, wherein:

the respective second set of symbols spans two symbols.

* * * * *